United States Patent [19]

Springett et al.

[11] 4,230,421
[45] Oct. 28, 1980

[54] SELF PROPELLED DYNAMICALLY POSITIONED REEL PIPE LAYING SHIP

[75] Inventors: Charles N. Springett, Santa Ana; Dan Abramovich, Mission Viejo; Stanley T. Uyeda, Orange; E. John Radu, Fountain Valley, all of Calif.

[73] Assignee: Santa Fe International Corporation, Orange, Calif.

[21] Appl. No.: 903,180

[22] Filed: May 5, 1978

[51] Int. Cl.$^2$ .......................... F16L 1/00; B63B 35/04
[52] U.S. Cl. .................................. 405/168; 405/154; 405/166
[58] Field of Search ............... 405/166, 168, 158, 159, 405/160, 161, 162, 163, 164, 165, 173; 114/65 A, 65 R, 76, 78, 254; 115/34 R

[56] References Cited

U.S. PATENT DOCUMENTS

| 1,426,990 | 8/1922 | Johnson | 114/72 |
|---|---|---|---|
| 2,853,968 | 9/1958 | McLean | 114/72 |
| 3,237,438 | 3/1966 | Tesson | 405/168 X |
| 3,318,278 | 5/1967 | Huebotter | 114/72 UX |
| 3,372,461 | 3/1968 | Tesson . | |
| 3,552,345 | 1/1971 | Harlander | 114/72 |
| 3,587,505 | 6/1971 | Wells | 114/72 X |
| 3,630,461 | 7/1971 | Sugasti et al. | |
| 3,635,186 | 1/1972 | German | 114/57 |
| 3,641,778 | 2/1972 | Gibson | 405/168 |
| 3,680,342 | 8/1972 | Mott et al. | 405/168 X |
| 3,685,306 | 8/1972 | Mott | 405/168 |
| 3,712,100 | 7/1973 | Key et al. | |
| 3,822,559 | 7/1974 | Matthews et al. | 405/166 |
| 3,855,835 | 12/1974 | Tisdale | 405/168 X |
| 3,924,415 | 12/1975 | Goren et al. | 405/166 |
| 3,982,402 | 9/1976 | Lang et al. | 405/168 |
| 4,011,826 | 3/1977 | Yee | 114/65 A |
| 4,043,285 | 8/1977 | Nordstrom | 114/72 |

FOREIGN PATENT DOCUMENTS 601103 7/1948 United Kingdom .

Primary Examiner—Dennis L. Taylor
Attorney, Agent, or Firm—LeBlanc, Nolan, Shur & Nies

[57] ABSTRACT

A self propelled reel pipelaying ship, having forward, midship, and stern sections, and baseline, tank top, and main deck levels, comprising substantially longitudinal outer hull members and port and starboard side inner longitudinal bulkheads, each extending substantially the length of the ship, the hull members and bulkheads extending from the baseline to the main deck level in the forward and stern sections and, in the midship section, substantially above the main deck level, substantially horizontal transverse midship structural members extending between the top portions of the raised midship sections of the outer hull members and inner longitudinal bulkheads, intermediate substantially horizontal transverse members extending between the outer hull members and inner longitudinal bulkheads and vertically spaced between the tank top and midship structural members wherein the midship portions of the outer hull members and inner longitudinal bulkheads, the transverse midship structural members and the intermediate transverse members together comprise a reel support structure, and means for rotatably mounting a pipe-carrying reel to the reel support structure such that the load of the reel is distributed downwardly and outwardly, both longitudinally and transversely through the ship to maintain the stress on primary structural members of the ship within allowable stress limits for the materials used in the construction of said primary structural members.

39 Claims, 32 Drawing Figures

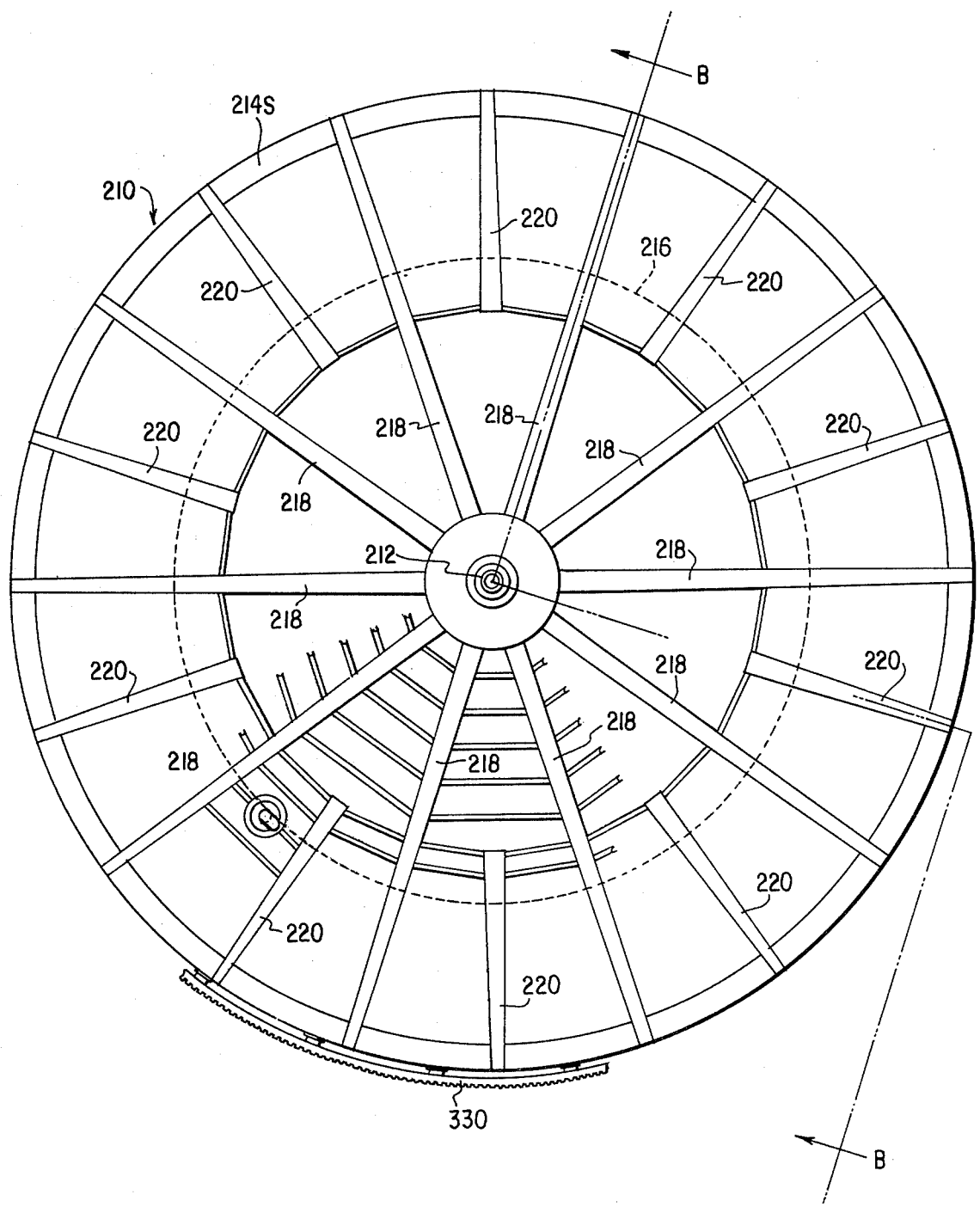

FIG. 8A
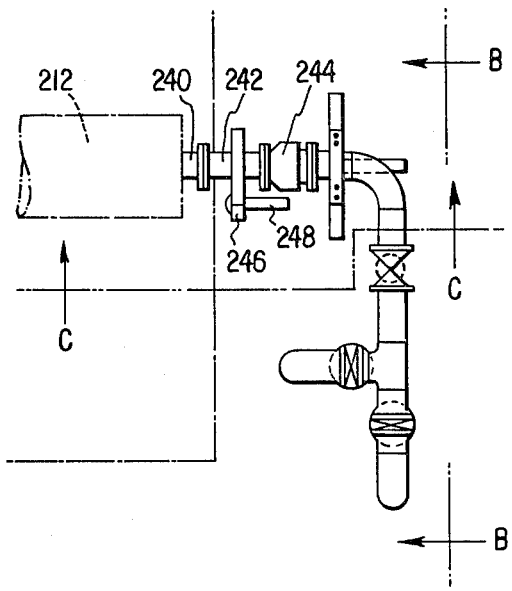
FIG. 8B
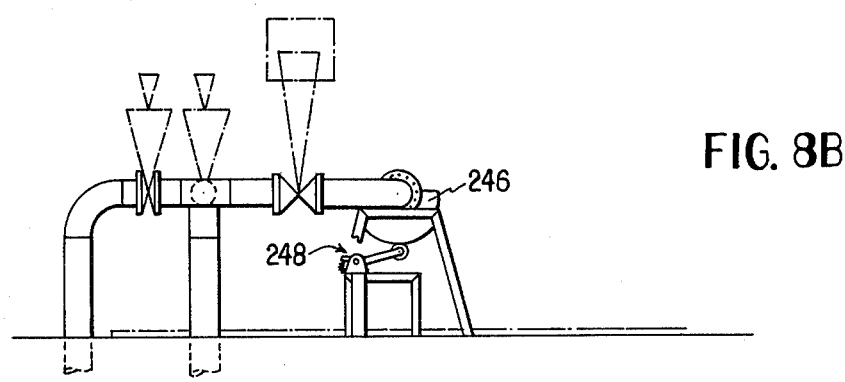
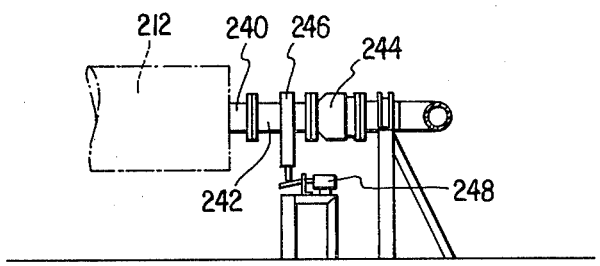
FIG. 8C

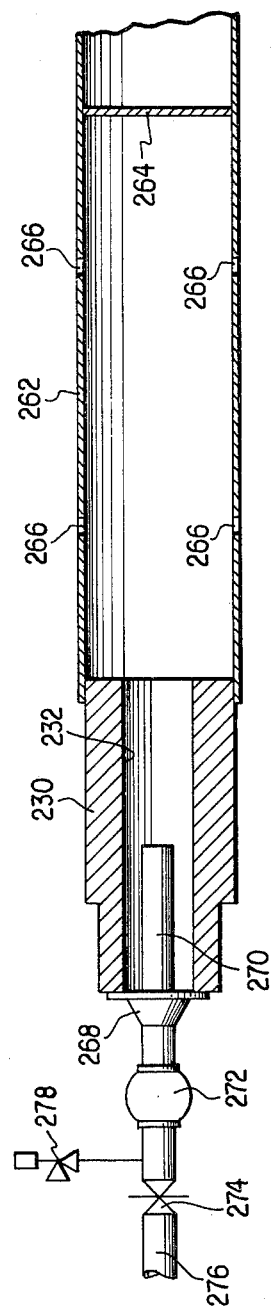
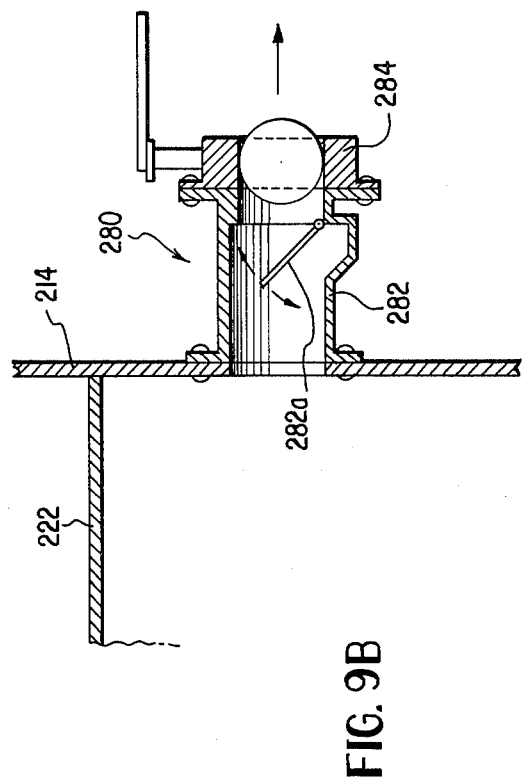
FIG. 9A
FIG. 9B

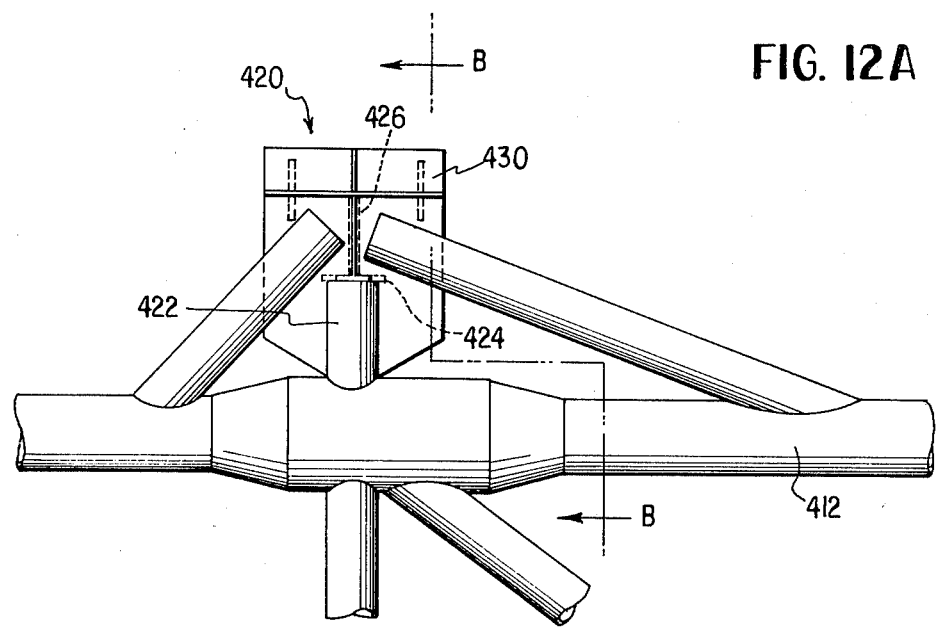
FIG. 12A
FIG 12B
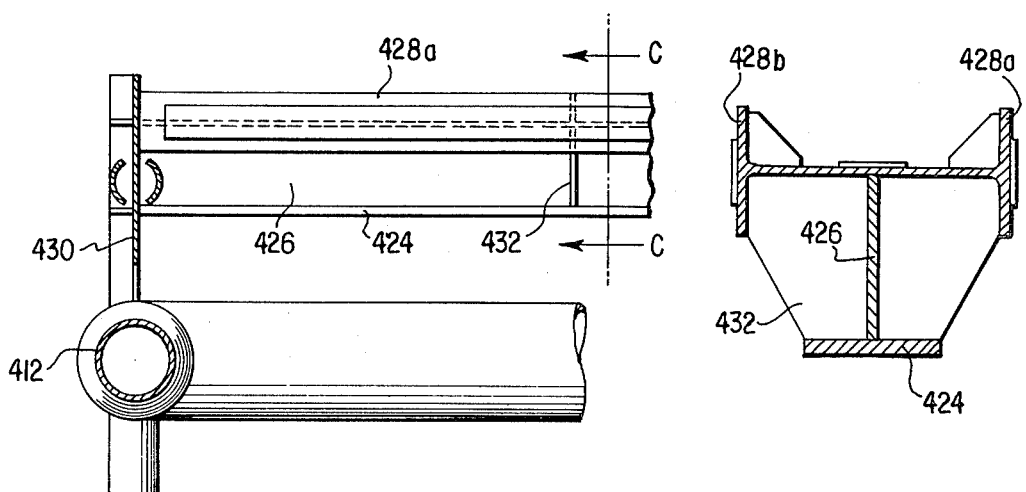
FIG. 12C

FIG. 16
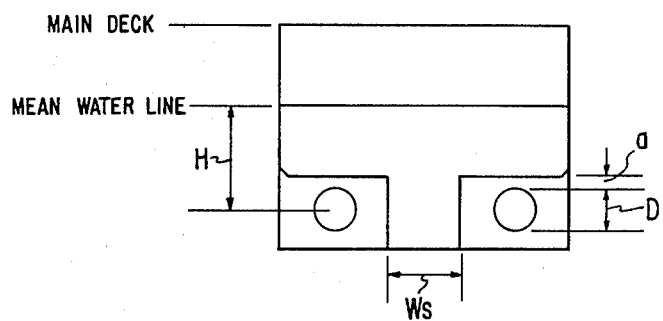
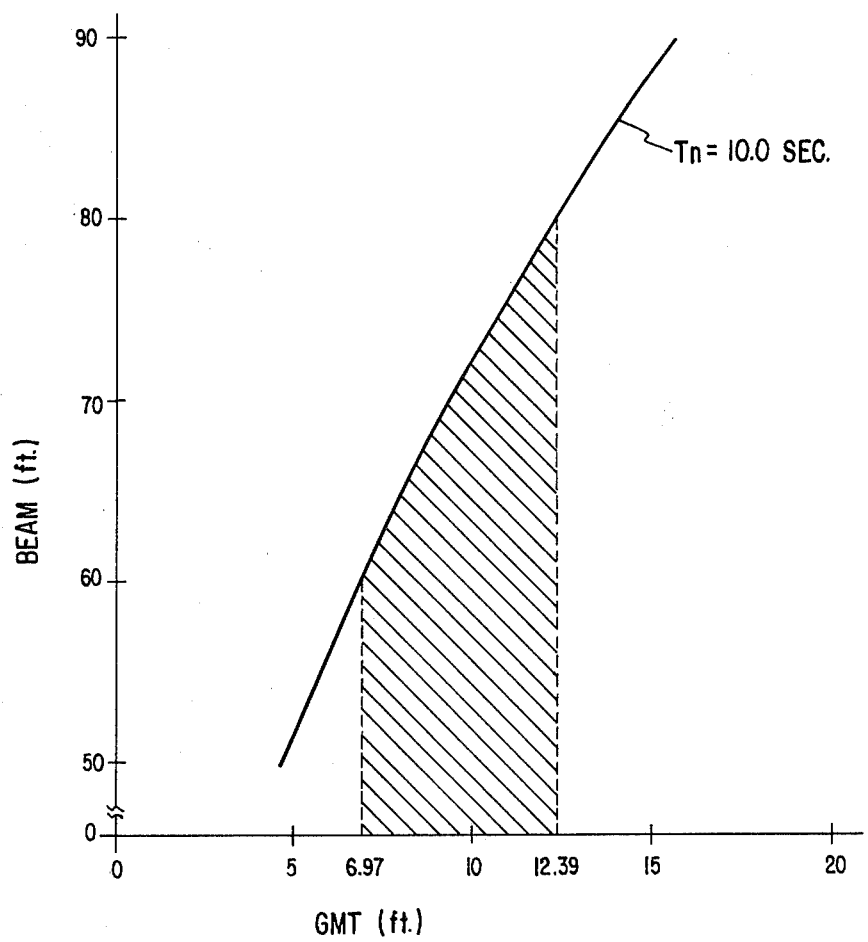
FIG. 17

SELF PROPELLED DYNAMICALLY POSITIONED REEL PIPE LAYING SHIP

CROSS REFERENCE TO RELATED APPLICATION

This application is related to a commonly assigned application of similar title concurrently filed herewith by Stanley T. Uyeda et al having Ser. No. 903,181.

BACKGROUND OF THE INVENTION

1. Field of the Invention

This invention relates to a reel pipelaying vessel. More particularly, the invention pertains to a new type of ship, specifically a self-propelled, dynamically-positionable reel pipelaying ship, in which a pipe spooling reel and associated pipe handling equipment are integrated into the ship's construction.

The vessel of this invention has been specifically designed to accommodate a permanently mounted pipe spooling reel substantially larger than any other pipe spooling reel heretofore known or used and capable of spooling substantially larger size pipe than any heretofore used.

2. History of the Prior Art

In laying offshore subsea pipelines for such uses as the gathering of oil and/or gas from offshore subsea wells, as, for example, in the Gulf of Mexico, it has been conventional to use one of two main methods to lay the pipe. In the first, or "stovepiping" method, a pipeline is fabricated on the deck of a lay barge by welding together individual lengths of pipe as the pipe is paid out from the barge. Each length of pipe is about 40' or 80' long. Thus, the pay-out operation must be interrupted periodically to permit new lengths of pipe to be welded to the string. The stovepiping method requires that skilled welders and their relatively bulky equipment accompany the pipelaying barge crew during the entire laying operation; all welding must be carried out on site and often under adverse weather conditions. Further, the stovepiping method is relatively slow, with experienced crews being able to lay only one to two miles of pipe a day. This makes the entire operation subject to weather conditions which can cause substantial delays and make working conditions quite harsh.

The other principal conventional method is the reel pipelaying technique, in this method, a pipeline is wound on the hub of a reel mounted on the deck of a lay barge. Pipe is generally spooled onto the reel at a shore base. There, short lengths of pipe can be welded under protected and controlled conditions to form a continuous pipeline which is spooled onto the reel. The lay barge is then towed to an offshore pipelaying location and the pipeline spooled off the reel between completion points. This method has a number of advantages over the stovepiping method, among them, speed (one to two miles per hour); lower operating costs (e.g., smaller welding crews and less welding equipment must be carried on the lay barge); and less weather dependency.

Historically, the technique of laying undersea fluid-carrying pipelines had its rudimentary beginnings in England in the 1940's. in the summer of 1944, 3" nominal bore steel tubes, electrically flash-welded together, were coiled around floating drums. One end of the pipe was fixed to a terminal point; as the floating drums were towed across the English Channel, the pipe was pulled off the drum. In this manner, pipeline connections were made between the fuel supply depots in England and distribution points on the European continent to support the allied invasion of Europe. (See Blair, J. S., "Operation Pluto: The Hamel Steel Pipelines", Transactions of the Institute of Welding, February 1946.)

The broad concept of reel pipelaying was also disclosed in British Pat. No. 601,103 (Ellis), issued Apr. 28, 1948, wherein it was suggested that lengths of pipe be joined together at the manufacturing plant and coiled onto a drum, mounted on a barge or ship; the loaded barge would then be moved to the desired marine location and the pipe unwound from the drum by fixing one end of the pipe and towing the barge away from the fixed location.

While the concepts described in British Pat. No. 601,103 and those actually used in Operation Pluto were adequate for wartime purposes, no known further development work or commercial use of the technique of laying pipe offshore from reels was carried out after World War II. After a hiatus of about fifteen years, research into the reel pipelaying technique was renewed and was carried on by Gurtler, Hebert & Co., Inc., of New Orleans, Louisiana; by 1961, Gurtler, Hebert had sufficiently advanced the reel pipelaying technique to make it a commercially acceptable and viable method of laying pipe in the offshore petroleum industry, able to compete with the traditional stovepiping technique. The first known commercial pipelaying reel barge, called the U-303, was built by Aquatic Contractors and Engineers, Inc., a subsidiary of Gurtler, Hebert, in 1961. The U-303 utilized a large vertical axis reel, permanently mounted on a barge and having horizontally oriented flanges (generally referred to in the trade as a "horizontal reel"). A combined straightener-level winder was employed for spooling pipe onto the reel and for straightening pipe as it was unspooled. The U-303 first laid pipe commercially in September, 1961, in the Gulf of Mexico off the coast of Louisiana and was used successfully during the 1960's to lay several million linear feet of pipe of up to 6" diameter. The U-303 reel pipelaying barge is described in U.S. Pat. No. 3,237, 438 (Tesson) and U.S. Pat. No. 3,372,461 (Tesson), both assigned to the assignee of the invention hereof.

The successor to the U-303, currently in use in the Gulf of Mexico and known in the trade as the "Chickasaw", also utilizes a large horizontal reel, permanently mounted to the barge such that it is not readily movable from one carrier vessel to another. Various aspects of "Chickasaw" are described in the following U.S. Pat. Nos., all assigned to the assignee of the invention hereof:

Sugasti, et al. 3,630,461
Gibson 3,641,778
Mott, et al. 3,680,432
Key, et al. 3,712,100

Commercial reel pipelaying techniques require the use of certain pipe handling equipment in addition to the reel. Among such pipe handling equipment essential to any commercial reel pipelaying system is a straightener mechanism. This may take the form of a series of rollers or tracks, or any other arrangement which imparts sufficient reverse bending force to the pipe to remove residual curvature so that after unspooling, the pipe will lay substantially straight on the sea bottom. No such pipe-conditioning apparatus was used in Operation Pluto or contemplated by the British Ellis Patent.

U.S. Pat. No. 3,982,402 (Lang, et al.) describes an apparatus for laying pipe from a vertical reel in which the pipe conditioning apparatus is pivotable to adjust the lift-off angle of the pipe relative to the horizontal (e.g., the deck of a ship) as a function of the water depth in which the pipe is being laid. This has distinct commercial advantages, especially where the reel pipelaying system is incorporated into a self-propelled ship, such as that of the present invention, capable of traveling to different job sites, having different pipe size and/or lay depth requirements.

An early concept for a reel pipelaying ship is described in Goren, et al., "The Reel Pipelay Ship—A New Concept" Offshore Technology Conference Proceedings, May 1975 (Paper No. OTC 2400). This paper (hereafter the Goren, et al. 1975 OTC Paper) describes advantages and operating features of a proposed reel pipelaying ship. However, the cost of construction of a ship as described there was estimated to be on the order of $100,000,000; by contrast the ship of the herein described invention is currently under construction at less than one-third that estimate. The research and development work for the ship described in the Goren et al paper, (done at great expense by or on behalf of the assignee of this application) was subsequently materially revised in numerous major respects, and substantial changes and improvements were made to achieve the design of the substantially different reel pipelaying ship described hereinafter; this new reel ship is or will be materially different in concepts, construction features, mode of operation and results compared with the ship described in the Goren et al paper.

SUMMARY OF THE INVENTION

There is an increasing need in the offshore petroleum industry to lay pipelines in deep and rough water, singly and in multiple pipeline bundles, and in remote areas far from supply bases. The dynamically-positioned pipelaying reel ship of this invention represents a new and different approach to meeting these needs.

The fact that the reel ship of this invention is self-propelled substantially eliminates the need for support vessels, such as tugs and supply boats, required by known pipelaying barges of either the stovepiping or reel laying type. In addition, the reel ship is highly mobile and has the capability of laying pipe in remote areas far from any supply base.

The reel ship also has an advantage in being able to discharge pipe in deep water where it is extremely difficult or impossible for conventional stovepiping or reel barges to operate. This is due to the adjustable ramp assembly which mounts the pipe conditioning apparatus at the stern of the ship; the ramp assembly is adjustable to allow pipe to enter the water at very steep angles (up to about 60°) while conventional barges are limited to about a 15° entry angle. This allows the reel ship to work without a stinger, which is required by conventional barges; elimination of the stinger contributes to the ability of the reel ship to work in rough weather.

A principal feature of the reel ship of this invention lies in its hull construction. In order to support the load of the reel and its full complement of pipe, the ship utilizes a novel design which increases its longitudinal strength, supports the reel at a height to accommodate the largest permitted reel size, and increases the covered deck storage area.

Another feature of the reel ship is its use of the reel hub as a ballast compartment. In order to keep vessel roll motion to a minimum and to ensure that the main propellers and thrusters are submerged sufficiently to allow efficient and non-cavitational operation, the draft must be maintained constant at or near the load line draft as pipe is spooled off. To achieve this, ballast water must be added to the hull during the unspooling operation. If the water is added to the ballast tanks in the double bottom, the overall center of gravity of the ship (KG) is lowered with a resulting increase in statical stability, conveniently represented by GM. Increasing GM, and thus increasing ship's stability, decreases the natural period of roll and hence increases the roll motion that will be experienced in sea conditions in which it is desirable to be able to operate. In order to minimize this increase in GM, as pipe is unspooled from the reel, water ballast can be added to a ballast compartment located within the reel hub in such amount as to partially or wholly compensate for the weight of pipe being offloaded.

For convenience, the following terms may be employed in the description of this invention:
1. A "turn" is that length of pipe wound through one complete revolution of the reel;
2. A "wrap" comprises a plurality of turns making up a layer of pipe wound on the reel across the full or substantially full width of the reel.

Other features and advantages of the reel ship of this invention will become apparent from the following detailed description of a preferred embodiment.

BRIEF DESCRIPTION OF THE DRAWINGS

FIG. 7A is a starboard elevation of the pipelaying reel partly in section to show internal bracing, taken along lines A-A in FIG. 7B;

FIG. 8A is a top plan view of one embodiment of the vent conduit system of the reel ballast system;

FIG. 8B is a view along lines B-B in FIG. 8A;

FIG. 8C is a view along lines C-C in FIG. 8A;

FIG. 9A shows a sectional view of the reel shaft with its associated piping for a second embodiment of the reel ballast system;

FIG. 9B shows a sectional view of the venting valve arrangement mounted on the reel hub for the second embodiment of the reel ballast system;

FIG. 12A is a side elevation of one level wind track shown in box 12 in FIG. 11B;

FIG. 12B is a view of the starboard portion of the ramp and level wind track looking aft, taken along line B-B in FIG. 12A;

FIG. 12C is a section of the level wind track taken along line C-C in FIG. 12B;

FIG. 16 is a schematic of the skeg and props of the ship;

FIG. 17 is a graph which represents the relationship between a reel ship's beam and GMT;

FIGS. 1-5, 7A, & B, 10A-10C, 11A, 11B, 12A-12C, 13A, 13B and 14A-14C are taken from construction layout drawings and are drawn substantially to scale. Within each of these figures the component parts or elements are substantially in proportion.

DESCRIPTION OF THE PREFERRED EMBODIMENT

1. Hull Construction (FIGS. 1-6)

Figure 1:
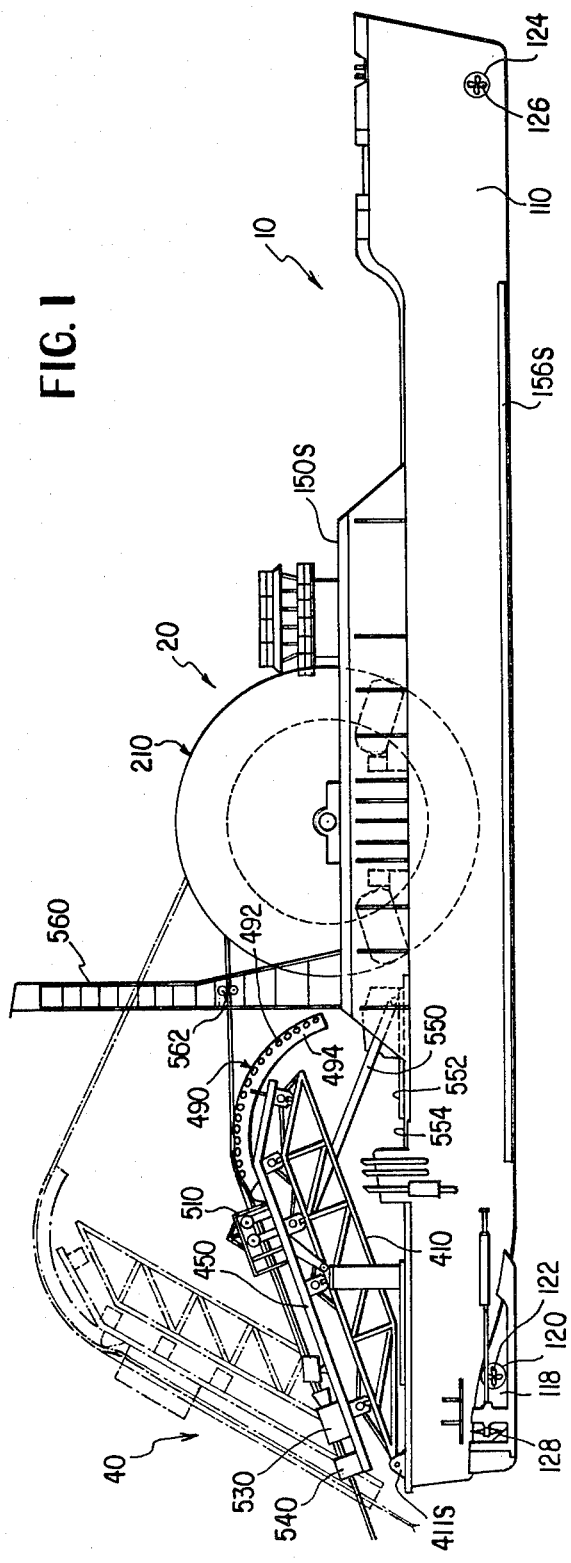
FIG. 1 is a starboard side elevation of a preferred embodiment of the reel ship.
Figure 2:
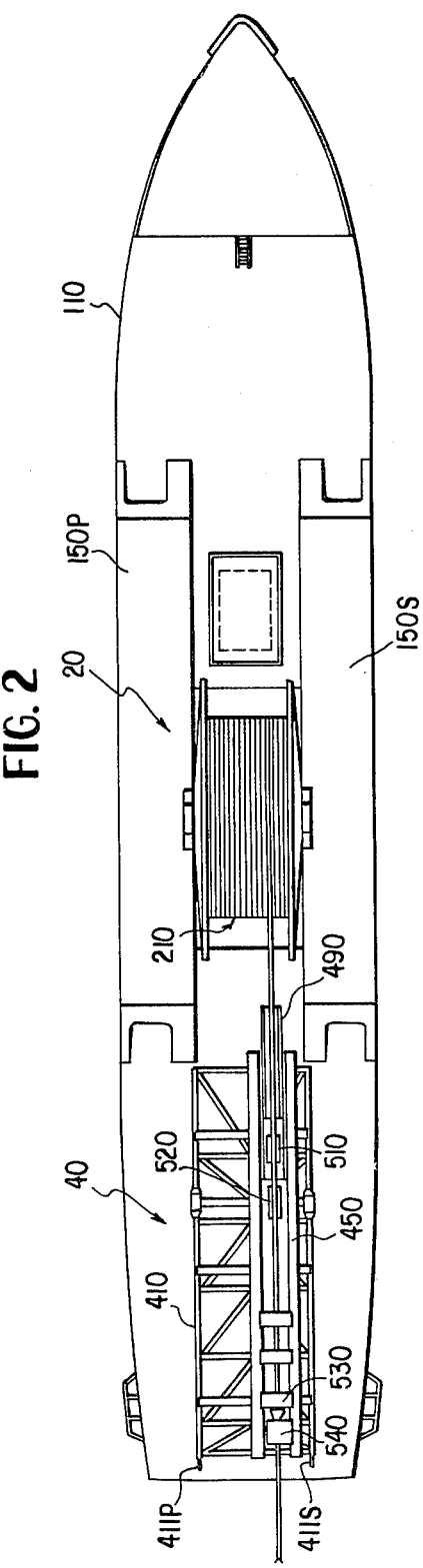
FIG. 2 is a top plan view of the reel ship of FIG. 1.
Figure 3:
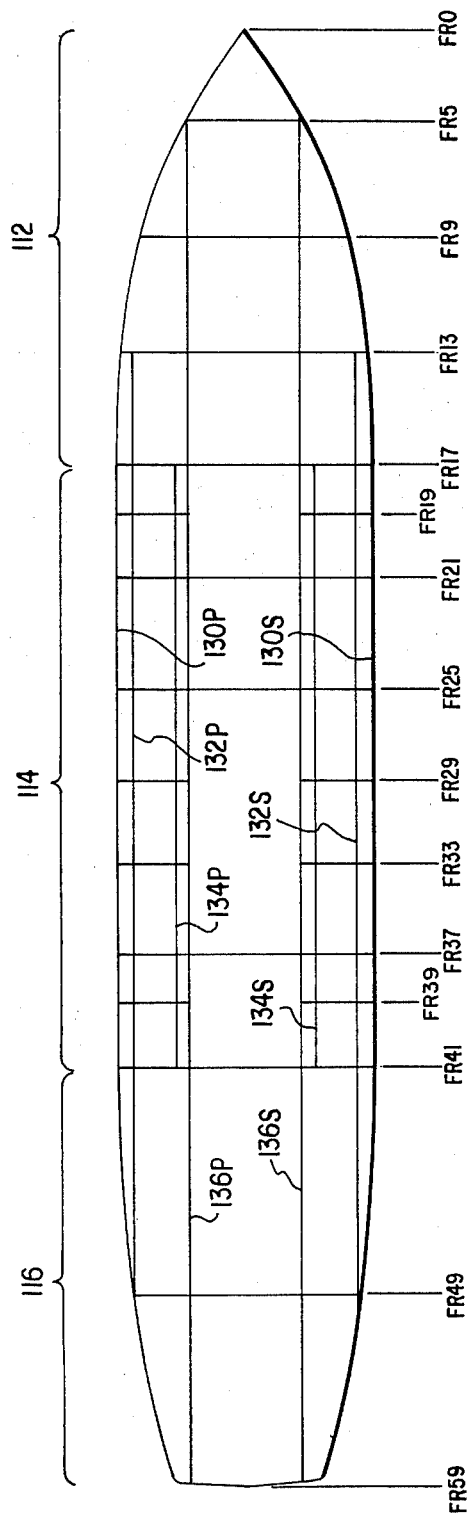
FIG. 3 is a plan view of the main inner bottom hull structure of the embodiment of FIG. 1.
Figure 4:
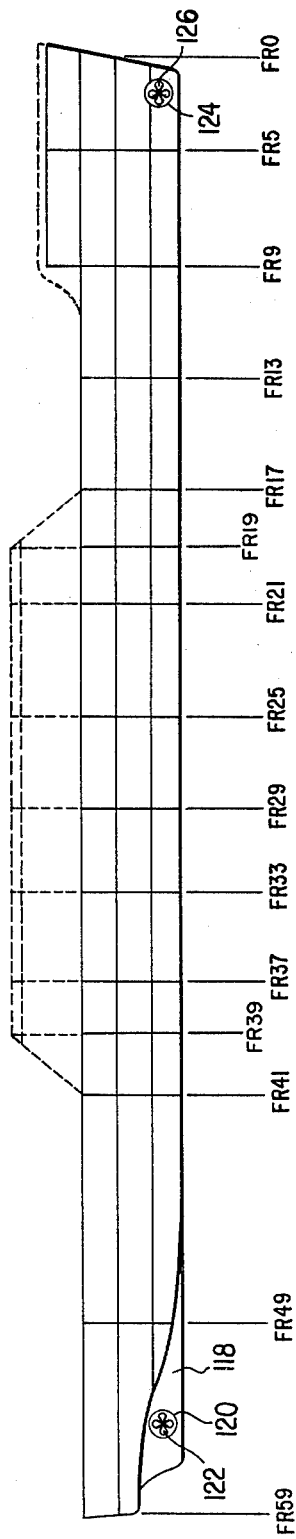
FIG. 4 is a profile of the main hull structure of the embodiment of FIG. 1 with the shell plating removed.
Figure 5:
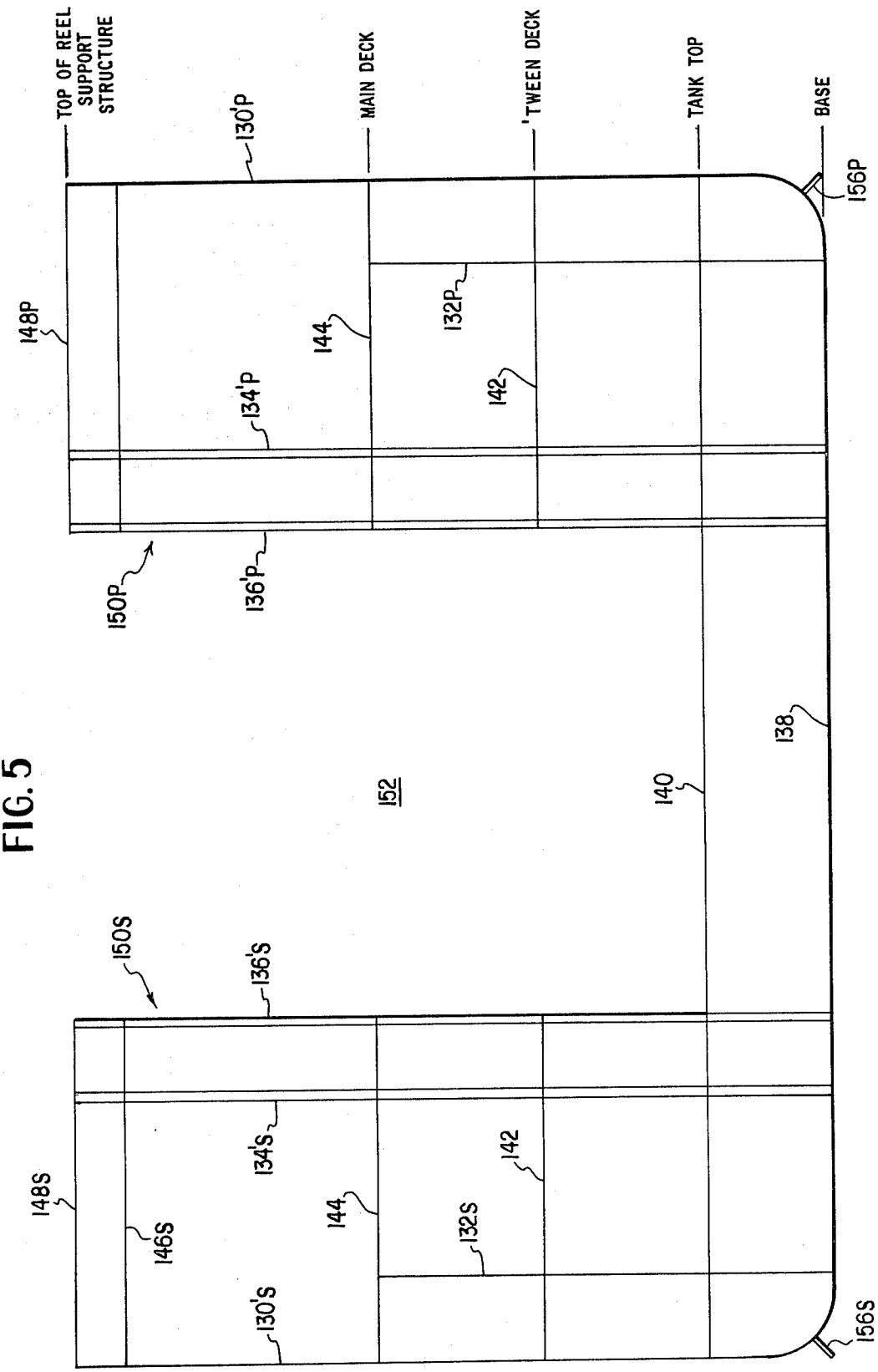
FIG. 5 is a midship cross-section of the reel ship hull through, e.g., frame FR 25, in FIGS. 3 and 4.
Figure 6:
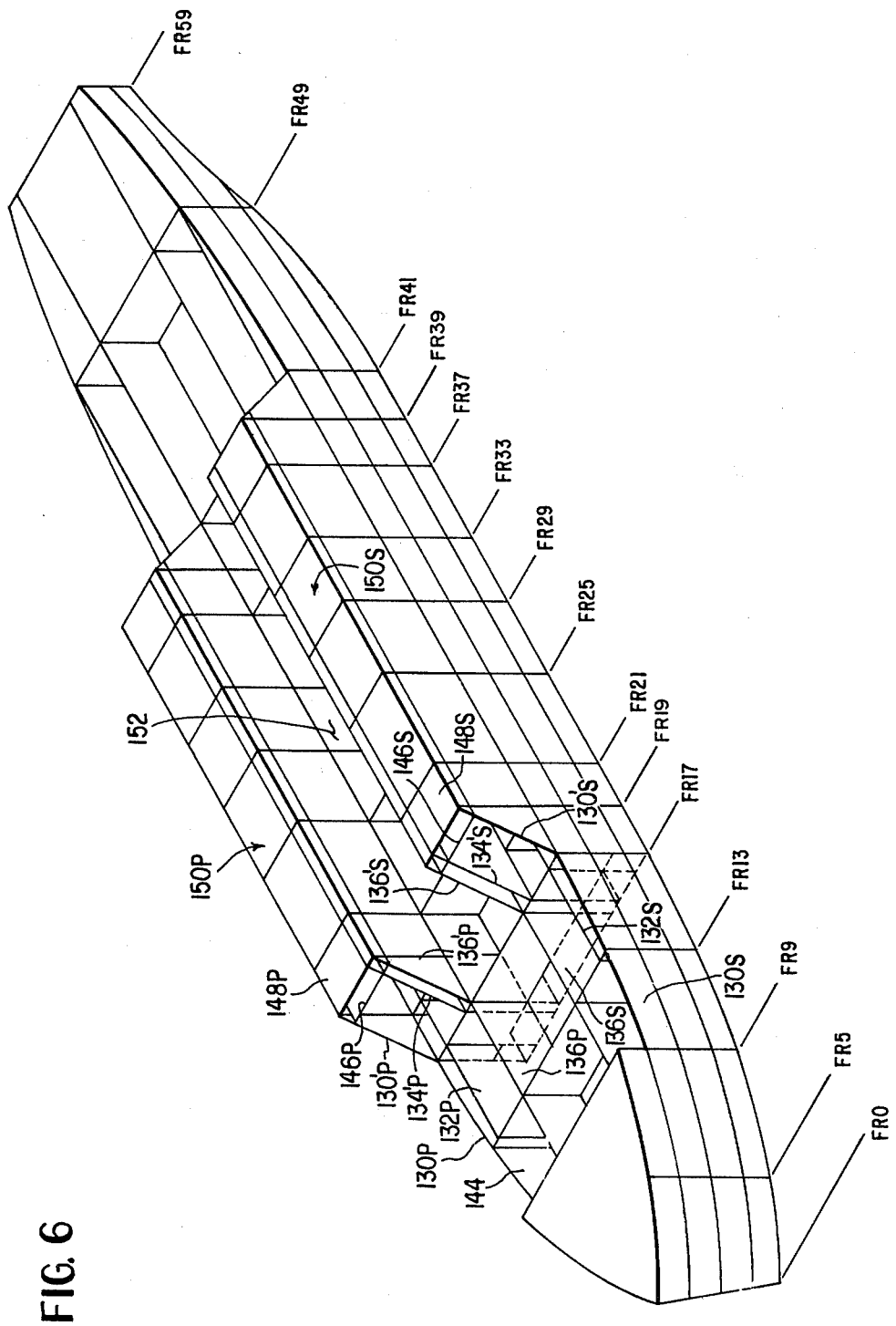
FIG. 6 is a perspective of the skeletal structure of the reel ship hull with main deck and 'tween deck plating removed between frames FR 9 and FR 49.

The reel ship, generally designated 10, is designed to carry a main pipe-spooling reel system and its associated support and drive assemblies, generally designated 20, and pipe conditioning equipment, generally designated 40, located aft of the reel system assemblies 20.

The ship's hull, generally designated 110, comprises a forward section 112, a midship section 114, and a stern section 116. The ship construction is referenced primarily to frames (designated FR) which locate hull structural members in transverse planes. The forward section 112 is defined approximately between frames FR 0 and FR 17; the midship section 114 which carries the reel assemblies 20, lies approximately between frames FR 17 and FR 41; and the stern section 116, which mounts the pipe conditioning equipment 40, lies approximately between frames FR 41 and FR 59.

The stern section 116 preferably includes, on its underside a skeg 118 which serves to increase stern buoyancy, to protect the main propellers 128, such as from floating or submerged objects or from grounding in shallow water, and to provide housing for a stern thruster or thrusters 122; and to improve directional stability of the vessel. The skeg, which consists of a substantially wedged shaped structure after part of the ship's keel, is an advantageous but not essential feature of the reel ship. It is particularly useful to increase stern buoyancy at relatively shallow draft, on the order of about 13'-15', and where the size of the ship may be limited by economic and/or practical considerations, such as the need to be able to negotiate canals or ship channels of relatively limited size.

Advantageously, the skeg is so sized that, at high draft, it contributes between about 1.41% and 2.1% of the ship's buoyancy; at low draft, it contributes between about 1.04% and 1.48% of the ship's buoyancy (see Table I below).

TABLE I

| SHIP DIMENSIONS | | SKEG BUOYANCY (as % of total ship buoyancy) | |
|---|---|---|---|
| | | High Draft | Low Draft |
| Ship Length (L) | Skeg Width ($W_s$) | (13') | (18') |
| 385' | 16' | 1.48 | 1.04 |
| 400' | 16' | 1.41 | 0.99 |
| 400' | 24' | 2.1 | 1.48 |

The skeg also advantageously houses one or more thruster tunnels 120 for stern thrusters 122. The bow section 112 houses one or more thruster tunnels 124 for bow thrusters 126. One embodiment contemplates the use of two bow and two stern thrusters. The bow and stern thrusters, which are reversible, assist in course and station keeping by giving the reel ship lateral or transverse positioning capability, while main props 128 provide fore and aft drive and, in conjunction with the ship's rudders, positioning capability.

As an alternative to tunnel-mounted thrusters, as shown, 360° rotatable azimuthal thrusters may be utilized; such azimuthal thrusters are extendable below the hull for use and are retracted into the hull when the vessel is underway or entering shallow draft areas. Azimuthal thrusters would be a likely alternate when a skeg is not built into the ship.

It is intended that the thrusters (whether of the tunnel or azimuthal type) be manually controllable to allow the operator to maintain the ship on a desired course, especially during a pipelaying operation. If the operator determines that the ship is too far to the right or left of the desired course, he can apply a manual correction using the thrusters; the result is a manually controlled dynamic positioning of the ship. By the addition of suitable equipment, the dynamic positioning control may be made automatic.

The location of the propellers with respect to the hull bottom provides advantages in terms of efficiency of operation as well. In particular, referring to FIG. 16, the propellers must be so located with respect to the load line to avoid cavitation; this is a function of the prop diameter (D, in feet) and the distance (H, in feet) from the mean water line at a given ship's draft to the center of the prop. A second factor relates to the location of the prop with respect to the hull bottom to minimize vibration; this is a function of the prop diameter (D) and the distance (a, in feet) between the hull bottom and periphery of the prop.

It has been found that H should be 1.125D; preferably the ratio H:D is in the range of about from 0.625:1 to 1.125:1 between vessel high and low draft conditions, respectively. The distance "a" between the hull bottom and the tip of the propeller blades should be not less than 0.2D; "a" is preferably between about 0.2D and 0.4D, and more preferably is about 0.2125D.

FIGS. 3-6 show the primary structural arrangement of the ship. The reel pipelaying ship of this invention utilizes a novel reel support structure and multiple bulkhead box-beam construction in the midship section of the vessel to support the weight of the fully loaded reel.

American Bureau of Shipping (ABS) regulations require that primary structural elements be continuous for the length and/or breadth and/or height of the vessel. In the reel ship of this invention, such primary structural elements include outer longitudinal hull walls 130 (corresponding elements on the starboard and port sides are designated "S" and "P", respectively) and a double longitudinal bulkhead arrangement comprising longitudinal bulkheads 134 and 136 which lie interiorly of a single bulkhead 132 between frames FR 17 and FR 41.

Longitudinal bulkheads 136 run substantially the length of the ship between frames FR 5 and FR 59. Hull walls 130 and bulkheads 134, 136 extend vertically from the baseline (hull bottom) to the main deck level except between frames FR 19 and FR 39 where midship portions, generally designated 130', 134', 136', respectively, extend upwardly to the top of the reel support structure. Bulkheads 130', 134', and 136' taper to the main deck level at their fore ends between frames FR 19 and FR 17 and at their aft ends between frames FR 39 and FR 41.

Single bulkheads 132 which are not generally considered as primary structural members, lie interiorly of and are spaced from the outer hull walls 130 between frames FR 13 and FR 49 (which includes the midship section between frames FR 17 and FR 41). Longitudinal bulkheads 132 extend vertically from the baseline to the main deck level throughout their length.

In the transverse direction, primary ship structural members which also form part of the reel support structure include web frames FR 17, FR 21, FR 25, FR 37, and FR 41. Additional fore and aft primary transverse structural members include web frames FR 5, FR 9, FR 13, FR 49, and FR 59. Web frames FR 5 - FR 59 extend vertically from the baseline to the main deck level of the ship. All of the transverse bulkheads, except those comprising frames FR 29 and FR 33, extend across the entire beam of the ship. The bulkheads comprising web frames FR 29 and FR 33 extend transversely only between the outer hull walls 130 and the innermost longitudinal bulkheads 136. A space or well 152 in the midship section is thereby defined for receiving a pipe carrying the reel 210; this reel well 152 is bounded by the bulkheads comprising web frames FR 25 and FR 37 fore and aft, respectively and longitudinal bulkheads 136S and 136P.

In normal ship construction, the frame spacing is maintained substantially equal throughout. In the reel ship of this invention, the mid-section frame spacing is shortened between frames FR 25 - FR 37 to accommodate the large weight of the reel. In one embodiment, for example, the reel weighs about 800 tons and is capable of carrying a full load of between 1,500 and 2,000 short tons of pipe.

Horizontal members of the hull structure include the baseline 138, the tank top 140, the 'tween deck 142, and the main deck 144. The tank top 140 extends across the entire beam of the ship and longitudinally between the bow and about frame FR 52.

A pair of horizontal midship structural members 146 and 148 extend transversely between the outer hull wall 130 and inner double longitudinal bulkhead 136 above the main deck 144; midship structural members 146 and 148 extend longitudinally between frames FR 19 and FR 39. Upper member 148 also advantageously comprises the lifeboat deck.

The main deck 144, lower and upper midship horizontal structural members 146 and 148, respectively, and the portions 130', 134', 136' of outer hull wall 130 and outer and inner double longitudinal bulkheads 134 and 136 respectively, between main deck 144 and upper midship horizontal structural member 148 comprise a box-beam reel support structure, generally designated 150, which sits atop the main deck level in the midship section between web frames FR 19 and FR 39, with the ends tapering to web frames FR 17 and FR 41, respectively.

The box-beam reel support structure 150 comprises a highly advantageous feature of this invention. One of the primary problems of a reel ship relates to the large concentrated load applied at the middle of the ship by the main reel. Substantially the entire reel load is concentrated in two bearings, one on each side, which cover a relatively small part of the ship's length. If the ship is considered as being poised on two wave crests, one at each end of the ship, the reel load concentrated on the bearings creates a large sagging or bending moment at the middle of the ship which drops off rapidly in the fore and aft directions. It is necessary to counteract this large bending moment in the center. Normally, at least a substantial part of this bending moment would be counteracted by the main deck and 'tween deck hull structure. However, the continuity of main deck 144 and 'tween deck 142 in the reel ship is lost due to the reel well 152 located in the middle of the ship just in the region where the bending moment counteracting forces are required. Due to this discontinuity in the main deck and 'tween deck structure, there is insufficient section modulus in the ship to react the bending moment created by the reel.

The problem of adequately reacting the bending moment due to the reel imparted load is solved in the present invention by the box-beam reel support structure 150. The overall structure of a vessel can be considered as a composite longitudinal I-beam in which the double bottom of the hull comprises the bottom flange and the main deck is the upper flange. In the reel ship of this invention, the bottom flange is continuous, whereas the upper flange is broken by the reel well. The upper flange at the point of maximum bending moment has been moved up to the top of the box section 150 and the webs are comprised of hull walls 130 and double bulkheads 134, 136; the latter distribute the shear load of the reel downwardly and outwardly in the planes of the bulkheads 134, 136 to the bottom flange.

Because the bending moment due to the reel load is so peaked and drops off rapidly in the fore and aft directions, the box-beam support structure 150 need not extend more than the minimum required by classification society (e.g., ABS) regulations. In particular, the box-beam 150 need not extend the entire length of the ship. The length of the box-beam 150 (in this case the distance between frames FR 17 and FR 41) need only be at least about 0.4 L, where L is the length of the ship. This is a highly advantageous feature of this invention because it reduces the amount of space required for the support system (which space is useable for other purposes) and reduces the overall cost of the vessel substantially.

By virtue of the fact that the support structure 150 comprises a box-beam located above and resting on the main deck level, the shear load is spread out from the reel into the structure of the ship in the fore and aft directions. The box-beam structure 150 in conjunction with the other hull members transmit the shear load from the reel 210 efficiently into the rest of the hull and ultimately into the shell plate (baseline 138) in such a way as not to exceed the load limits of the shell plate and so that the shear forces can be resisted by the buoyancy forces on the shell plate.

The double bulkhead—box-beam construction used in the reel ship of this invention has a number of advantages, including:

1. Increasing the section modulus of the ship in the middle by the use of relatively little additional structure; the box-beam distributes the reel load through the ship so as to maintain the stress on the primary structural members well within maximum allowable stress limits for the materials used, according to the pertinent classification society requirements. As a corollary, for the sagging condition the box-beam 150 maintains the compressive stress in the top flange and tensile stress in the bottom flange of the composite longitudinal beam of the vessel structure within maximum allowable limits.

2. Supporting the rotational axis of reel 210 axis at the height required to accommodate the largest permitted reel size (based on maximum pipe diameter and length to be carried by the ship). This avoids construction of a much larger ship and results in substantial cost savings.

3. Providing a longitudinal passageway between bulkheads 134 and 136 for access to compartments such as storage and/or personnel cabins located between the bulkheads 134 and bulkheads 132.

4. Creating additional enclosed spaces for winches and other equipment, including, for example, the diving equipment. This additional space was made available by the discovery that it was not necessary to extend bulkhead 132 vertically to the full height of the box-beam structure 150. Rather, it was discovered that by advantageously having longitudinal bulkheads 134, 136 span the reel bearing support blocks (described below), substantially all of the effective load is transmitted through bulkheads 134, 136 to the lower composite beam flange (i.e., the double bottom of the ship's hull). Thus, a vertical extension of bulkhead 132 became superfluous.

In addition to the above-discussed advantageous features of the construction of the reel ship, other new and desirable features, as follows, are also apparent and are useable in preferred embodiments.

One of the advantageous features of the reel ship is its ability to operate in relatively shallow draft areas. The ship is designed to draw as little as 13'-14' of water, thereby enabling it to operate in essentially unlimited areas, including such as Australian waters, where sand bars limit vessel drafts to about 13 feet. Equally, or more important, the reel ship can operate out of shallow water ports, such as assignee's reel pipelaying shore base at Houma, Louisiana. Generally, a reel shore base requires a fairly large expanse of dock area. The land at deepwater ports is generally at a premium; shallow water port land is much less costly. Thus, there are economic and commercial advantages to a ship which can operate out of a shallow water base.

As a consequence of its shallow draft capability, provision must also be made for ballasting the ship down to its operating draft. This is advantageously accomplished by the double bottom hull design, in which the tank top 140 is spaced about twice the normal distance from the baseline 138 (normal spacing is about 3.5'; whereas in a preferred embodiment of this ship, the spacing is on the order of 7'). Space is thereby created for sufficient ballast to sink the ship to its desired normal operating draft (e.g., about 18 feet).

The space between bulkheads 132 and outer hull members 130 is void so that the construction of the major part of the vessel is equivalent to a double hull arrangement, at least between frames FR 13 and FR 49. This provides good reserve damage stability to the ship.

1a. Vessel Characteristics

An important hydrostatic characteristic of the reel ship that affects its hydrodynamic characteristics (i.e., that has an effect on its motion in waves) is its GMT (i.e., the vertical distance (in feet) from its center of gravity to the transvese metacenter of the ship). GMT changes with changes in the vessel load; generally GMT increases as the ship becomes lighter, i.e., as vessel load and draft decrease.

If the GMT of the vessel is too small, the vessel becomes statically unstable; slight shifts in weight, e.g., as the booms of cranes mounted on the vessel are swung around, will cause the vessel to heel a substantial and highly undesirable amount, possibly up to 10°. On the other hand, if the GMT of the vessel is too large, the ship becomes too stiff and the roll will be too great for acceptable operating conditions for personnel and equipment in prevailing seas.

In the reel ship of this invention, over 2,000 tons of pipe may be offloaded during a laying operation. As pipe is payed out from the ship, and the ship becomes lighter, the GMT will increase. If no adequate compensation is made for the removed pipe weight, the GMT could increase to the point where the pipelaying operation may have to be terminated prematurely because of excessive rolling action of the ship. In other words, without appropriate compensation, the reel ship would be limited to a more restricted range of operating sea conditions.

For example, consider vessel displacement at full load to be about 13,000 tons with an operating draft of about 18 feet. If no ballast is added after offloading the pipe, the vessel displacement will be around 11,000 tons and the draft will be 15 feet, resulting in the vessel being raised 3 feet out of the water. The GMT of the vessel changes from about 5.5 feet to about 13.3 feet, an increase of about 7.8 feet. (See Table II below, which compares the approximate GMT of the vessel under full load, half load and empty reel conditions, where no reel ballast is added and where ballast is added to the reel hub (or core) as pipe is unspooled). This increases roll stability of the vessel so that the ship becomes stiffer about the roll axis and increases the rate of roll of the vessel. Equally, if not more importantly, such decrease in draft reduces the efficiency of the main props and thrusters and increases the cavitation problem, as noted above.

The change in GMT of the vessel, from about 5 feet to nearly 14 feet as the pipe weight goes from 2,000 tons to 0 tons, would be a large change for a vessel of this type and size. In practical effect, this would be detrimental to the safety and comfort of personnel, to on-deck equipment, to overall ship operations, to the pipelaying operation in particular, and to the reel itself (due to excessive loading of the bearings and other reel support elements).

In order to maintain relatively constant displacement of the ship as pipe is payed out, ballast can be added in a conventional manner to hull ballast tanks (e.g., between the baseline and tank top). Although such bottom ballast will keep the draft at about 18 feet, the center of gravity of the vessel will shift downwardly as ballast is added. The result will be a change in GMT which may be outside acceptable commercial operating limits for the safety of personnel and equipment in prevailing seas.

In order to maintain commercially acceptable motion characteristics, it is a requirement that the GMT of this vessel be maintained within 25% of its initial height, which for commercial purposes, should not be more than about 7 feet, although a change of between 25% and 30% can be tolerated during the unreeling operation, and a greater change tolerated in calm sea conditions. Once a nominally optimum GMT for the vessel is determined, it is then desirable to maintain the change in this GMT as small as possible and at least within acceptable limits to avoid the overstability and excessive motion problems noted above.

For sea conditions in which normally expected maximum wave periods are in the range of about 5-8 seconds, the GMT (in feet) of such a reel ship should be no greater than $0.00194B^2$, where B is the beam (in feet) of the vessel. FIG. 17 shows the relationship between GMT and beam B for a natural vessel period $T_n$ of 10.0 sec., a commercially advantageous minimum period. The shaded area under the curve represents maximum commercially acceptable values of GMT for a reel ship of this invention. Advantageously and preferably, the GMT of the reel ship should be between about 3 feet and 8 feet under all significant offshore operating conditions. In order to maintain this GMT range, it has been found highly advantageous and preferable to provide ballast compensation at the level of the reel, and particularly in the reel hub, as pipe is unspooled (see Table II below).

TABLE II

| Reel Load | GMT (in feet) | |
|---|---|---|
| | without core ballast | with core ballast |
| Full | 5.51 | 5.51 |
| one-half | 10.22 | 6.68 |
| empty | 13.26 | 7.60 |

It is desirable that the hub be sufficiently large to accommodate enough ballast to maintain the change in GMT within commercially acceptable limits. In one preferred embodiment, the reel has a capacity to spool up to about 2,000 tons of pipe; the hub can hold up to about 1,600 tons of ballast. The remaining necessary ballast can be added to conventional hull tanks without adversely increasing the change in GMT of the ship.

In addition to the above-mentioned advantage of minimizing the change in GMT as the pipe is offloaded during a lay operation, the use of reel or core ballast has other advantages to the ship of this invention. For example, if the ship is carrying only a partial load of pipe, ballast can be added to or removed from the reel core to change the natural roll period of the ship and thereby reduce its roll motion. In this way, the GMT of the ship can be changed to adjust for varying sea conditions; in particular, the natural roll period of the ship can be changed, as necessary, with respect to prevailing periods to prevent resonance conditions from occurring.

The reel ship, with no reel load but with sufficient bottom ballast to achieve its operating draft of about 18 feet, has a very high GMT (with a concomitant short natural period). This results in a tendency of the ship to whip with high acceleration and deceleration forces. By adding ballast to the reel core, the GMT of the ship can be decreased to detune the vessel and create longer, slower roll periods, i.e., the natural period of the ship is increased.

Additionally or alternatively, the vessel roll may be damped by the use of bilge keels 156 and/or flume tanks (not shown). The bilge keels 156 are provided along the parallel mid-body of the vessel on the turn of the bilge as an aid in cutting down on ship's roll; preferably these keels should not extend beyond the outer projected horizontal and vertical vessel surfaces at least in part as protection against breaking off.

With respect to other vessel characteristics, it has been found that the length of the ship should be preferably between about 385' and 410'; the beam is preferably between about 60' and 80' and more preferably between about 68' and 73'. The ratio of beam (B) to draft (D) is preferably in the range of about 2.25:1-4.00:1 and more preferably in the range of 3.5:1-4.0:1.

2. Reel Assembly (FIGS. 7-10)

The pipe spooling reel system 20 comprises a reel 210 located near the longitudinal center of buoyancy, which is near the longitudinal geometric center of the vessel.

Reel 210 (see FIGS. 7A-B) is comprised of a central axial shaft, generally designated 212. Axially opposite flanges, generally designated 214S, 214P, extend radially outwardly from shaft 212. A hub, generally designated 216, co-axial with shaft 212, extends between flanges 214S and 214P. Each flange 214 is composed of a plurality of radial arms 218 extending from the shaft 212 outwardly to the flange rim. Typically, radial arms 218 may be spaced 30° apart around the circumference of the shaft 212. A further plurality of shortened radial reel arms 220, which extend radially outwardly from the surface of hub 216 to the flange rim, are located between adjacent arms 218.

The reel hub 216 comprises a circumferentially and axially continuous outer surface covering 222 extending between flanges 214S and 214P. A plurality of annular spacers 224 extend from the interior face of hub surface covering 216. The other ends of annular spacers 224 are secured (e.g., by welding) to transverse bracing members 226 which extend between opposed flanges 214S and 214P. Web plates 228 lie in radial planes between the interior surface of hub covering 216 and transverse bracing members 226 and between adjacent annular members 224. This interior construction of the reel results in a criss-cross or honeycomb structure under the plating 222 of hub 216. Such construction produces a reel with great strength necessary to accommodate large back tension forces which may occur during pipe laying and/or pipe retrieval operations. Such back tension forces produce a wedging action between adjacent turns of pipe in a wrap which cause large splitting forces to develope in the reel flanges 214.

Advantageously and preferably the ratio of the diameter of the reel (at the flange rim) to the width of the reel hubs for the reel ship is in the range of between about 3:1 and 4:1, more preferably, this ratio is in the range of about 3.5:1-3.8:1; still more preferably such ratio is about 3.7:1. In the preferred embodiment designed for construction, the reel diameter is about 82 feet and the hub width is about 22 feet.

2. Reel Ballast System

An important and advantageous feature of this invention lies in the fact that the interior of the hub 216 comprises a water-tight compartment to which ballast may be added as pipe is spooled off the reel. This ballast system requires means for supplying ballast, advantageously sea water, to the reel hub while the reel is rotating, at the same time providing means for venting the hub.

Figure 7B:
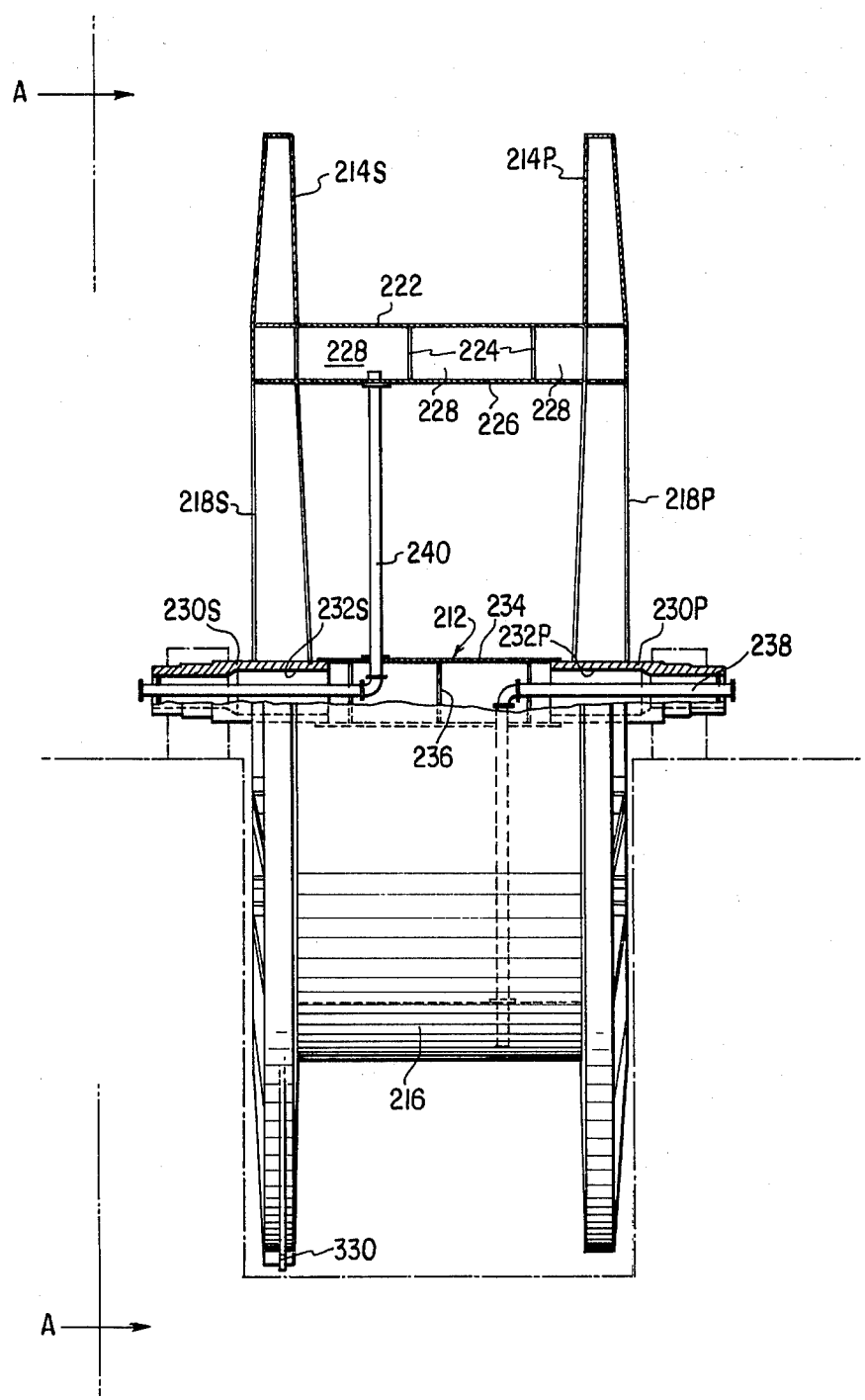
FIG. 7B is a part sectional view of the reel looking aft, through lines B-B of FIG. 7A.

A first embodiment of such a ballast system is shown in FIGS. 7A–7B. In this embodiment, shaft 212 comprises machined end portions 230, each having a central axial bore 232. End portions 230 extend from a tubular central portion 234 which has support plates 236 spaced from each other on the inside of tubular portion 234. Shaft ends 230 and tubular central portion 234 together act as unitary shaft element 212.

A fill and drain conduit 238 extends axially into the reel through one axial shaft bore 232 (e.g., bore 232P); inside the reel, conduit 238 makes a 90° bend and extends radially outwardly toward the interior surface of hub 216. The end portion of conduit 238 may be secured to a transverse member 226. A second or vent conduit 240 extends axially into the reel through the other shaft bore (e.g., bore 232S). Inside the reel, conduit 240 makes a 90° bend and extends radially outwardly toward the inner surface of hub 216; the end portion of conduit 240 may be secured to a transverse bracing member 226. Advantageously and preferably, conduits 238 and 240 extend in opposite radial directions from each other.

In one relatively simple embodiment, the fill and drain conduit 238 may be connected through a swivel connection to a T conduit, connected in turn through valve means to a pump which pumps ballast into the reel and to a drain conduit which pipes ballast overboard. Closing the outlet valve and opening the inlet valve permits sea water ballast to be supplied to the interior of the hub 216; opening the drain valve and closing the inlet valve allows the ballast to drain out of the hub and overboard.

Referring now to FIGS. 8A–8C, vent conduit 240 may be connected through a conduit 242, having an exterior cammed surface 246, to a swivel connection 244. The other side of swivel 244 is connected through conduit means to a vent discharge. The arm of a switch mechanism 248 contacts cammed surface 246 on conduit 242 to control the opening and closing of valves in the vent discharge line. The switch mechanism 248 is adjusted so that the valves are open for only a short period of time, e.g., when the opening of vent conduit 240 is within plus or minus 30° of its apex of rotation. This arrangement prevents a discharge of ballast water when the vent pipe rotates a sufficient distance to be submerged within the hub.

In an alternate arrangement, shown in FIGS. 9A–9B, tubular section 262 between shaft end 230 and a sealing plate 264 contains a number of openings 266 which communicate the interior of the tubular shaft portion 262 and the reel hub interior. The outer end of shaft portion 230 may be sealed by a flange 268 through which a pipe 270 extends. The outer end of pipe 270 may be connected through a swivel joint 272 and a gate valve 274 to a fluid supply conduit 276. A spring-loaded pressure relief valve 278 may be provided to avoid excessive fluid pressures from building up.

During the course of a pipelaying operation using this alternate arrangement, as the pipe is unspooled from the reel, water ballast is pumped into the reel hub through the valve 274, swivel joint 272, conduit 270, and openings 266 in shaft portion 262. As water is pumped in, air in the hub is vented to the outside through venting valves, generally designated 280 (FIG. 9B). At least two such venting valves are provided approximately 180° apart on one or both of flanges 214. Vent valves 280 comprise a gravity-operated scupper valve 282 and a lever-operated butterfly valve 284. The disc 282a of the scupper valve is gravity operated. Thus, as the reel rotates and the valve travels downwardly, at a certain point the disc 282a will be pulled closed, aided, if necessary, by the pressure of the ballast water in the hub as the valve moves below the water line; the escape of water ballast from the reel is thereby prevented (other than a possibly minimal amount which may escape before the valve is fully closed). As the reel continues to rotate and vent valve 280 moves up, it will eventually reach a point where the scupper valve 282 is above the water line and gravity pulls disc 282a down. This opens the vent valve 280 to vent air out of the reel hub interior. The butterfly valve 284 is normally kept open and is used essentially as a manual closure.

Figure 10A:
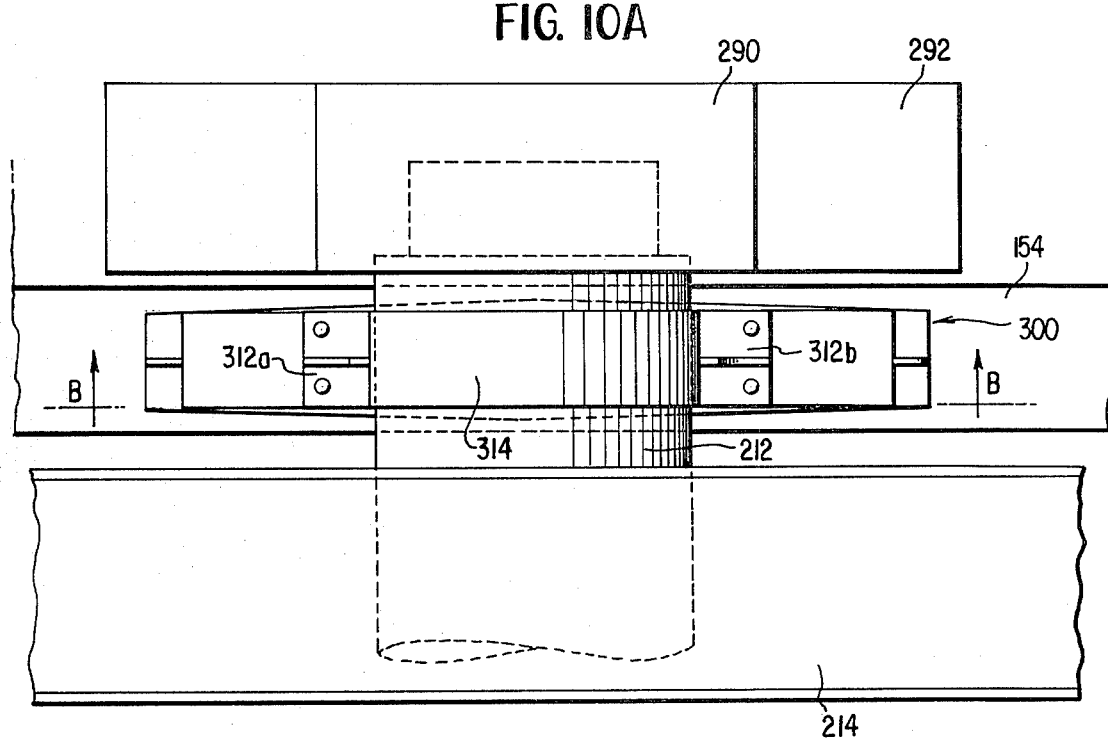
FIG. 10A is a top plan view of the starboard reel bearing assembly and an embodiment of a starboard side reel bearing unloading mechanism.
Figure 10C:
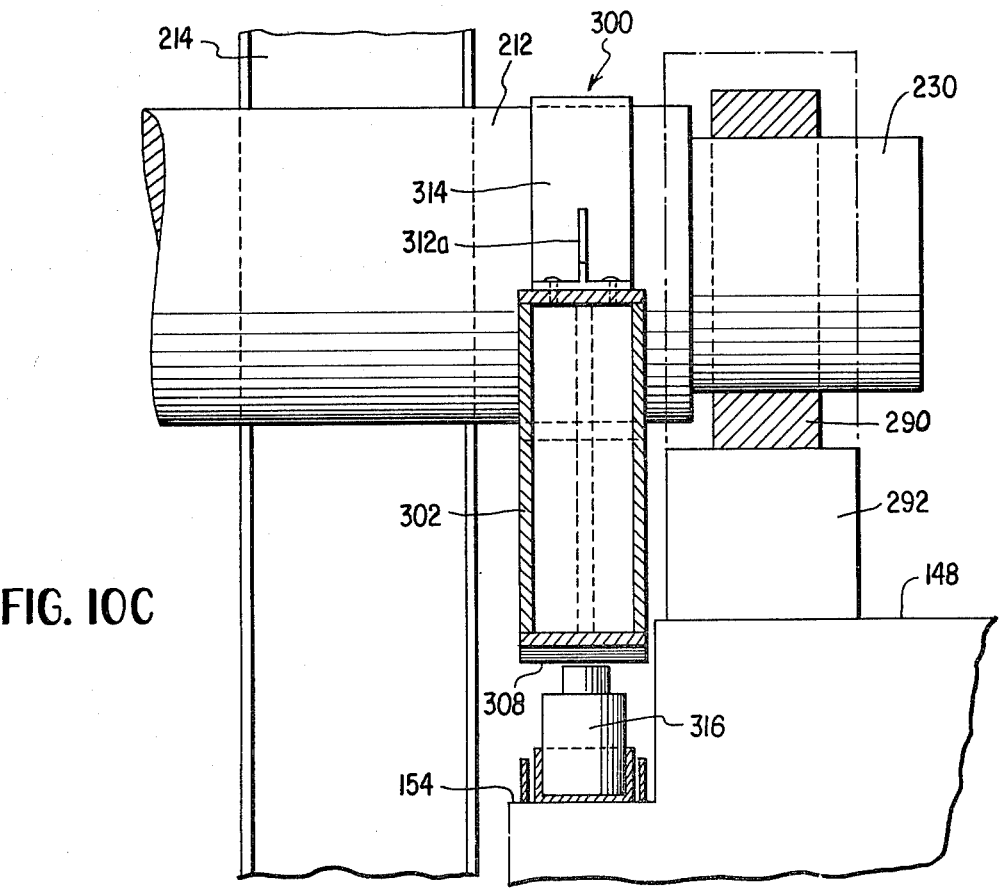
FIG. 10C is a partial section of the starboard side bearing unloading mechanism looking forward, taken along lines C-C in FIG. 10B.
Figure 10B:
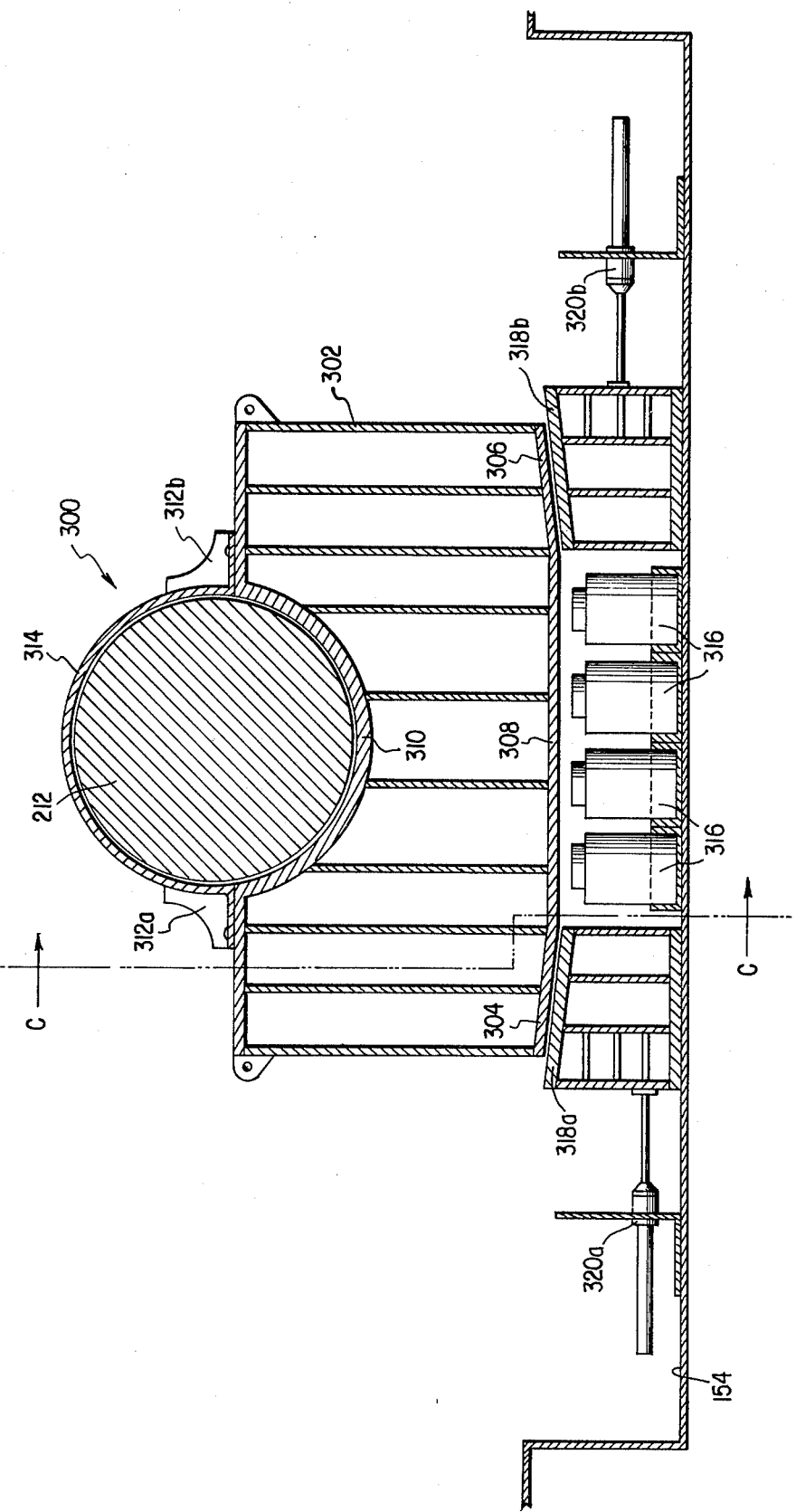
FIG. 10B is a sectional elevation of the unloading mechanism taken along lines B-B in FIG. 10A.

2b. Reel Support System (FIGS. 10A–10C)

The reel shaft 212 seats in a pair of axially opposite bearings 290. The bearings 290 can be any commercially available shelf bearings (e.g., FAG Model No. 539948 roller bearing). The bearing 290 rest on bearing support blocks 292. Bearing support blocks 292 in turn are secured to the upper midship horizontal structural members 148 comprising the top of the reel support structure 150. As noted earlier, the bearing blocks rest on bulkheads 134, 136, which distribute the reel and bearing load downwardly and longitudinally outwardly through the reel support structure 150 to the baseline 138.

Preferably and advantageously, the reel may be horizontally located within about ±5% of the longitudinal center of buoyancy. In the preferred embodiment of the vessel as designed for construction, the ship has a length of between about 385'–410'; the reel may be located within a range of about 20' fore and aft of the longitudinal geometric center.

When at sea, the reel ship will sometimes encounter heavy sea conditions which cause the vessel to roll from side to side, thereby placing large loads on the bearings. It may therefore be desirable to unload the bearings when the ship is traveling between pipelaying operations, particularly if smaller bearings than those presently contemplated are used or if the reel size and capacity are increased relative to the bearing size. For this purpose, means may be provided for unloading the bearings, preferably by jacking up the reel shaft to raise it off the bearing seat. An added advantage of this bearing unloading capability is that the bearings can be repaired or removed while the vessel is at sea.

One such unloading mechanism which could, if desired, be incorporated into the reel ship is shown in FIGS. 10A–10C. In this embodiment, a protion 154 of the reel well bulkheads are recessed between frames FR 27 and FR 35. This recess provides space for mounting a reel shaft support mechanism, generally designated 300. The support mechanism 300 includes a support truss 302, having wedge-shaped bottom portions 304, 306, between which is a generally flat bottom section 308. The upper face of the support truss 302 contains an arcuate recess 310. A pair of gussets 312, having arcuately shaped inner faces co-radial with the arc of surface 310, are located on the upper face of support trust 302 to continue the arc of surface of 310. An arcuate plate 314 is secured at its ends to gussets 312 and completes the circle which surrounds shaft 212. One or more hydraulic cylinders 316 mounted on the recessed deck portion 154 engage the bottom surface portion 308 of support truss 302. In the preferred embodiment, up to four hydraulic cylinders, each having a 400-ton lifting capacity, are employed with each of the port and starboard side reel shaft support mechanisms 300. A pair of longitudinally opposed movable end wedges 318a, 318b rest on the recessed deck portion 154 and are slideable under wedge-shaped bottom portions 304, 306 of truss member 302. Wedge members 318 are driven by respective hydraulic jacking screws 320a, 320b. Wedges 318 co-operate with hydraulic cylinders 316 to lift the support truss 302 and shaft 212, and to retain the truss 302 and shaft 212 in their elevated positions. By this arrangement, a strong adjustable structural support is provided for the shaft 212 and reel 210 which allows the bearings 290 to be unloaded for extended periods, such as under heavy sea conditions when the ship is traveling between jobs, or when bearing repair is required.

2c Reel Drive System

The reel drive system includes a drive gear 330 mounted around the outer rim of one or both flanges 214. In the embodiment shown, the drive gear is located on and circumferentially around the rim of starboard flange 214S. The reel is driven by one or more motors, as shown, for example, in the aforementioned Lang, et al. patent and/or Goren, et al. 1975 OTC paper. 332. Such motors are advantageously hydraulic motors (e.g., Hagglund Hydraulic Motor Model # H8385 with Brake Model # FBC-80-2-D or equivalent). The invention is not limited to the use of hydraulic drive motors; D.C. motors are also suitable because of their high torque capability at low speed. The reel drive mechanism also incorporates an automatic tension control feature which maintains a relatively constant tension on the pipe, particularly during lay and/or retrieval operations.

3. Pipe Conditioning Equipment (FIGS. 11-15)

The pipe conditioning equipment, generally designated 40, is mounted sternward of the reel assembly 20. The pipe conditioning equipment 40 includes, inter alia, a main support ramp assembly 410 and a level wind assembly 450. The level wind assembly 450 has various pipe handling equipment mounted thereon, including a pipe bending radius controller 490, pipe straightening equipment 510, a tensioning assembly 520, a pipe clamp assembly 530, a stern pipe guide assembly 540, and various fixed and/or movable work platforms.

3a. Support Ramp Assembly (FIGS. 11-12)

Figure 11A:
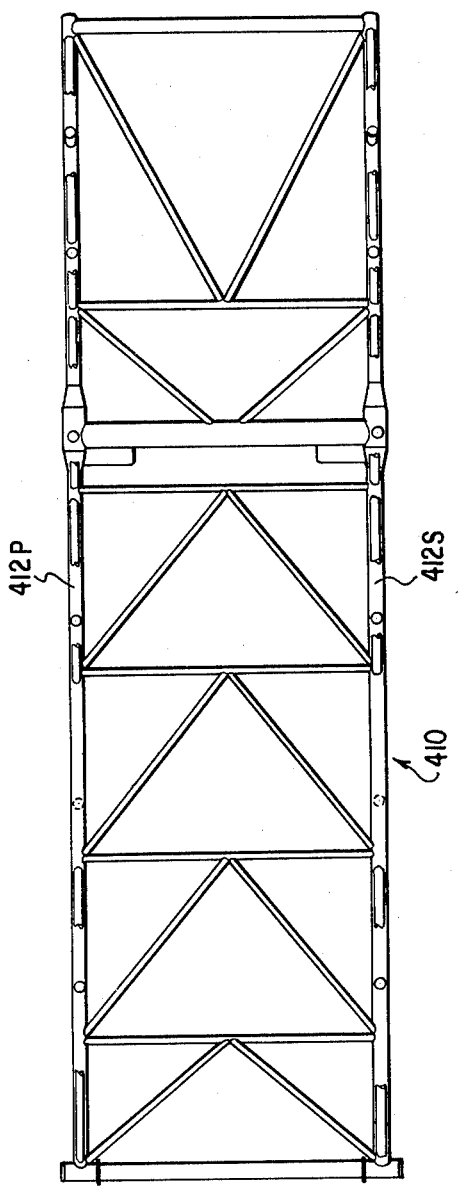
FIGS. 11A-B show plan and side views of the support ramp assembly located near the stern of the vessel in FIGS. 1 and 2.
Figure 11B:
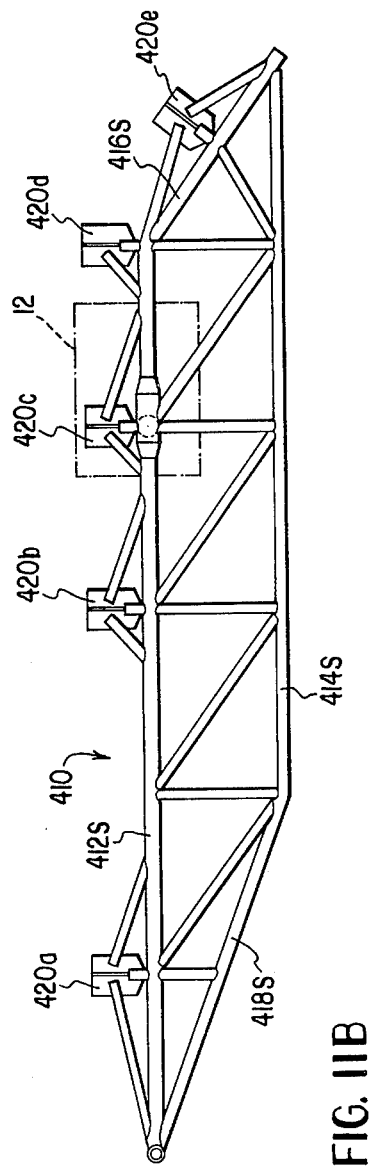

The support ramp assembly 410 preferably comprises an open truss framework of a type shown, for example, in FIGS. 11A-11B. The ramp support assembly 410 comprises upper and lower longitudinal frame members 412 and 414, respectively. These longitudinal frame members are advantageously interconnected by vertical, horizontal and/or diagonal bracing members for additional strength. Upper frame members 412 are longer than lower frame members 414; the upper and lower frame members are longitudinally offset from each other and are connected at their forward end by structural members 416 and at their aft end by structural members 418.

The support ramp assembly 410 mounts a plurality of tracks 420 extending transversely across the support ramp assembly. Tracks 420a-420d are mounted on upper frame members 412 so as to be substantially co-planer with each other. Track 420e is located on connecting members 416 at an angle relative to the plane of tracks 420a-420d.

FIGS. 12A-C show details of a typical ramp mounted level wind track 420. A track base support member 422 extends approximately orthogonally from each of upper frame members 412S and 412P. A track base plate 424 extends between and is secured (e.g., by welding) to each of track base support members 422. A T-shaped track member 426 having flared ends 428 extends upwardly from track base plate 424 and transversely between upper ramp frame members 412. The axially opposite ends of track members 426 are secured (e.g., by welding) to end support plates 430 which, in turn, are secured to the upper frame members 412 and track base support members 422. Additional intermediate track support members 432 may be provided to give the track 426 additional strength.

The support assembly 410 is mounted to the stern portion of the vessel at pivot points 411. Advantageously, a jacking truss 550 may be pivotably connected at one end to the support ramp assembly 410 and at the other end to a jacking mechanism 552 mounted on tracks 554 secured to the vessel deck. The jacking mechanism may be moveable along the tracks to pivot the ramp support assembly 410 about pivot points 411. This allows adjustment of the pipe path through the pipe handling assemblies to thereby adjust the exit or lay angle of the pipe relative to the water.

Figure 13A:
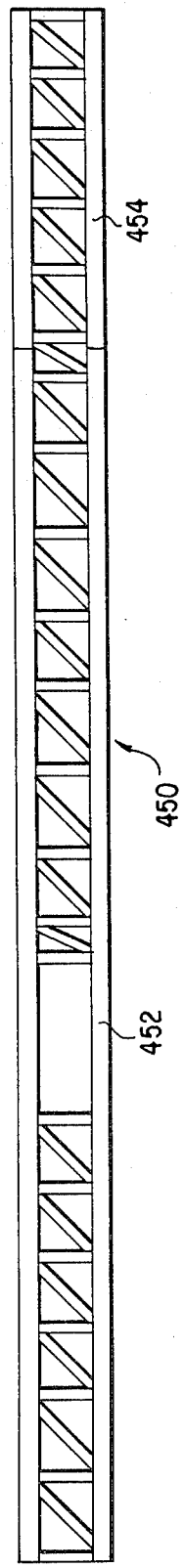
FIGS. 13A and 13B show top plan and starboard side elevations of the level wind truss assembly.
Figure 13B:
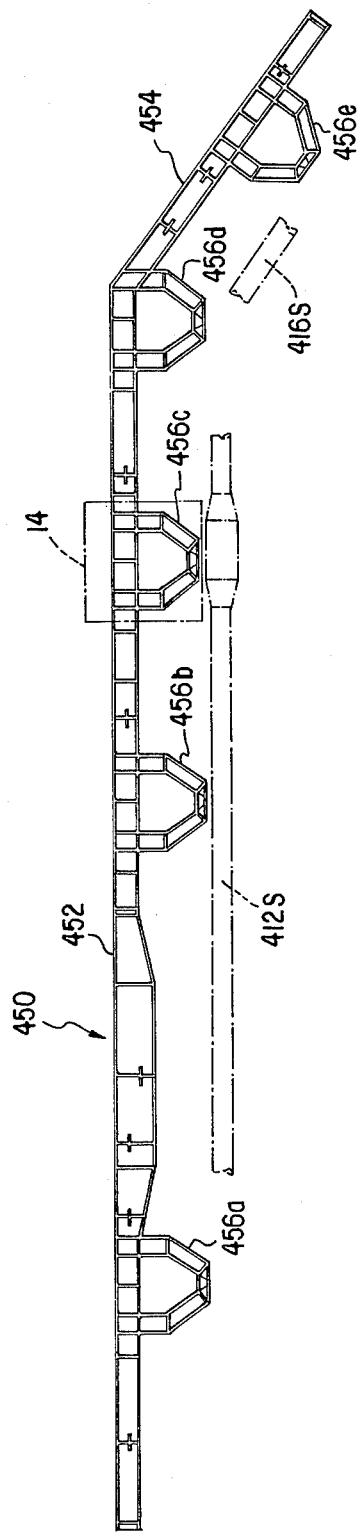
Figure 14C:
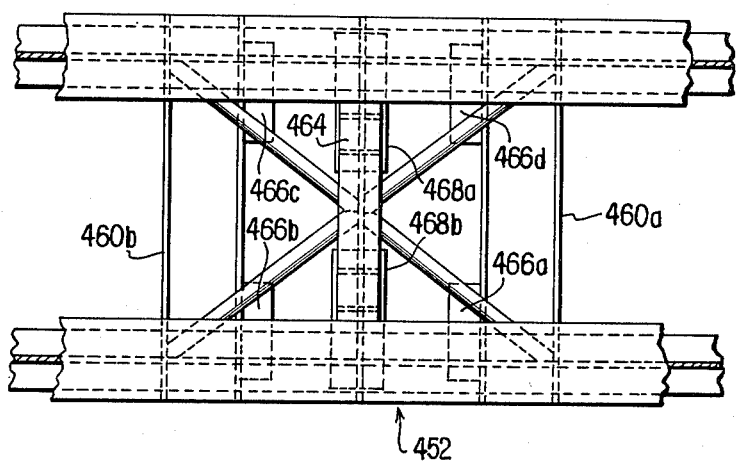
FIG. 14C is a plan view of the level wind roller carriage assembly taken along line C-C in FIG. 14B.
Figure 14B:
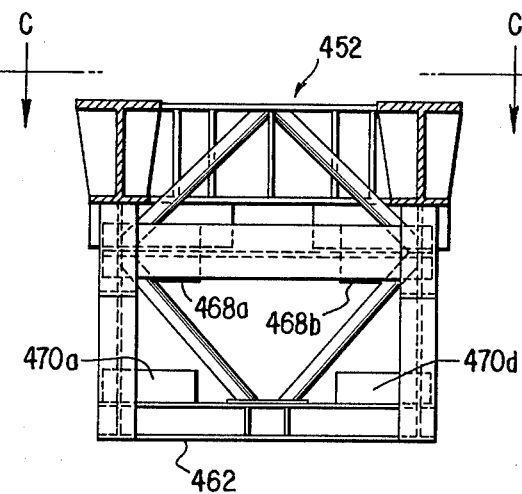
FIG. 14B is a view of the level wind roller carriage assembly looking aft, taken along line B-B in FIG. 14A.
Figure 14A:
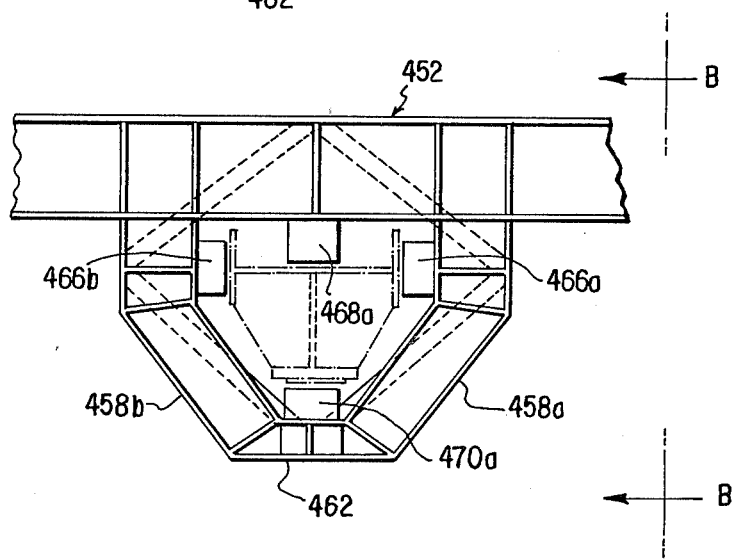
FIG. 14A is a starboard side elevation of one level wind roller carriage assembly shown in box 14 in FIG. 13B.
Figure 15A:
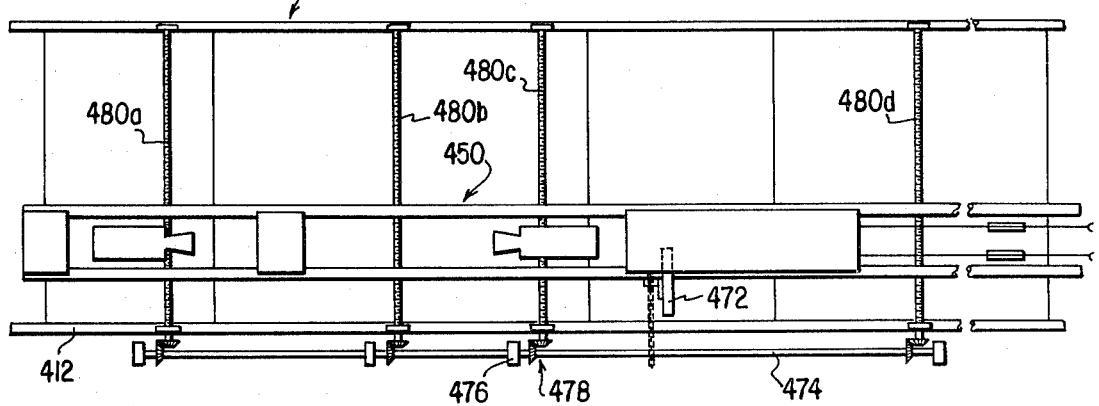
FIGS. 15A-15C show plan, side, and end elevations of the level wind drive assembly.
Figure 15B:
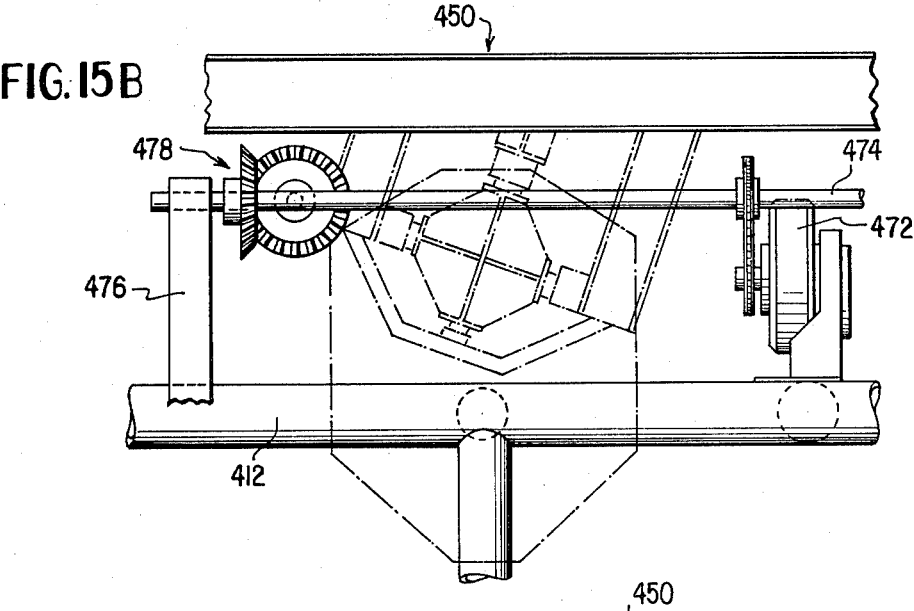
Figure 15C:
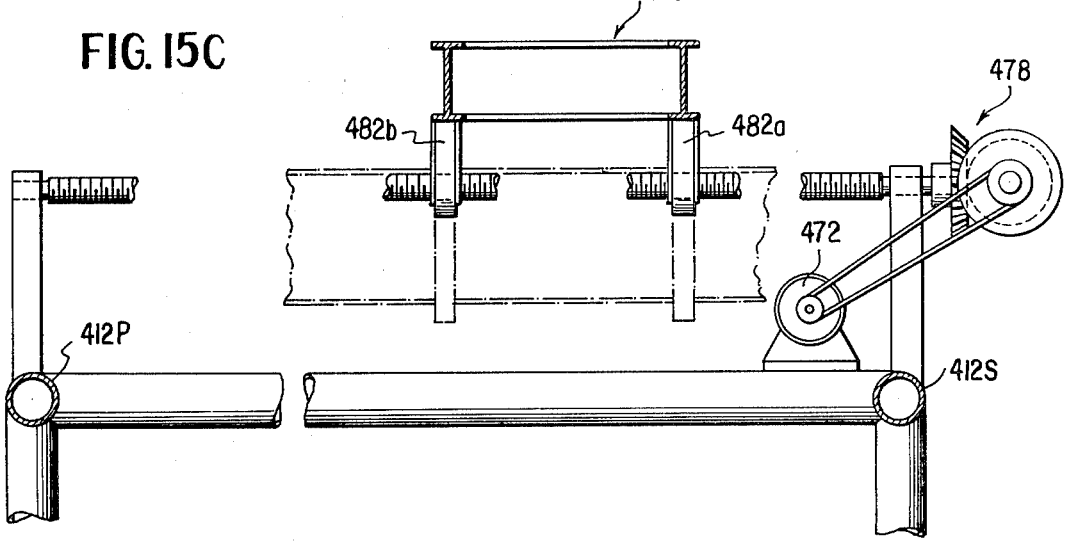
Figure 18:
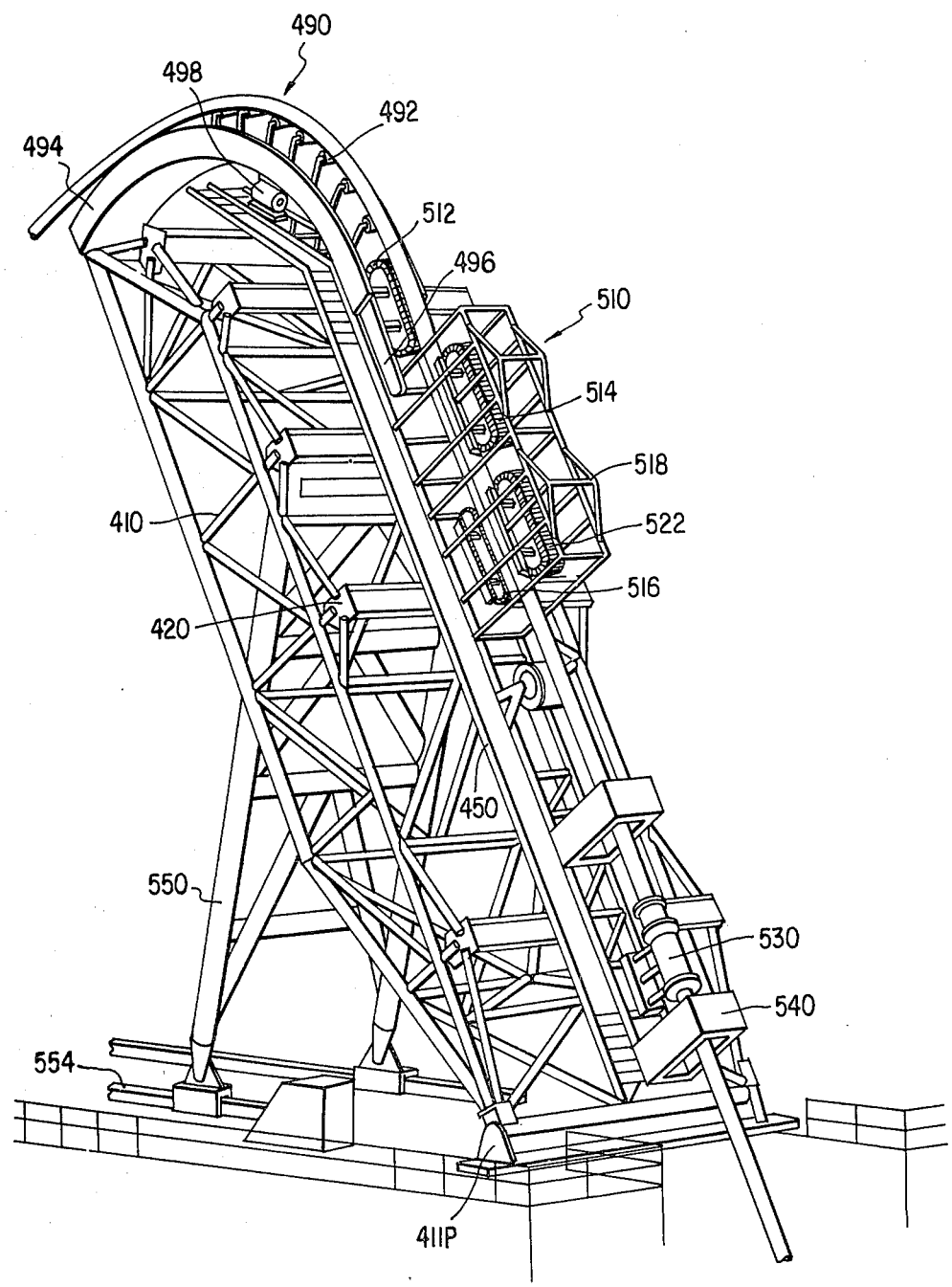
FIG. 18 is a perspective view looking forward of the pipe handling equipment.

3b. Level Wind Assembly (FIGS. 13, 14)

The level winder 450 consists of a main frame 452. A level wind frame section 454 extends from the forward end of main level wind frame 452 and at an angle thereto which essentially follows the angle of ramp frame connecting member 416.

A plurality of level wind roller carriages 456 extend from the underside of level wind truss 452. The basic construction of each carriage 456 is the same and comprises downwardly extending fore and aft carriage members 458 connected at the top by transverse frames 460 and at the bottom by transverse frame 462. The carriage is located so that a transverse frame member 464, comprising part of the level wind truss, lies intermediate transverse carriage frame members 460a, 460b. Each of carriage members 460 mounts a roller 466 (e.g., Hilman Roller Model No. 5XTDW 200-ton capacity) which rides on a corresponding flared end 428 of T-shaped track member 426. A third or top roller 468 (e.g., Hilman Roller Model No. 6X 300 ton capacity) is mounted to transverse frame member 464 and rides on the flat top surface of T-shaped track member 426. An optional fourth or bottom roller 470 (similar to rollers 466) is provided, especially on carriages 456c and 456d; bottom roller 470 is mounted to bottom frame member 462 and co-operates with the track base plate 424.

It will be seen that the level wind roller carriages 456 essentially surround the level wind tracks 420 while permitting the level wind structure 450 to traverse the width of the support ramp 410.

The level wind drive system may employ, in one contemplated embodiment, a hydraulic motor 472 connected through a chain drive to a drive shaft 474 which is mounted through bearing supports 476 to one of the ramp support frame members 412. Bevel gears 478 connect the drive shaft 474 with a plurality of jack screws 480 which extend transversely across the ramp assembly 410 between frame members 412S and 412P. The externally threaded jack screws 480 are threaded through complementary threaded openings in downwardly extending level wind drive connecting members 482. The hydraulic motor 472 rotates the drive shaft 474 which, through beveled gears 478, rotates jack screws 480. Such rotation of the jack screws 480 produces a traversing motion of the level wind assembly 450 across the width of the ramp support structure 410.

3c. Pipe Bending Radius Controller

At its forward end, the level wind assembly 450 mounts a stress uniformizer or pipe bending radius controller 490. The radius controller assembly may comprise a plurality of rollers 492 mounted to curved frame members 494, which are secured to the level winder frame 452. The radius controller is connected to the level winder through pivot mounting assemblies 496. A jacking mechanism 498 (e.g. a hydraulic screw jack) is advantageously coupled between the level wind forward frame members 454 and the radius controller frame 494. Through operation of the jacking mechanism 498, the radius controller can be pivoted about pivot mounts 496 as needed to adjust for the size of pipe and support ramp angle. In this manner, the amount of curvature to be imparted to the pipe before it enters the straightener 510 can be properly established for varying operating conditions.

The radius of curvature of radius controller assembly 490 is advantageously and preferably approximately the same as the minimum radius of curvature to which the inner wrap of the largest diameter pipe capable of being spooled on the reel 210 can be bent. The radius controller 490 imparts a substantially uniform stress and substantially constant radius of curvature to pipe as it is unspooled and prior to its entry into the straightener apparatus 510. The ratio of the radius of the reel hub $R_H$ to the radius of the radius controller $R_{RC}$ lies in the range of between about 1.2:1.0 and 1:1.2; more particularly, the preferred ratio is about 1.0:1.0.

3d. Straightener Assembly

A straightener assembly 510 is mounted to the level wind assembly 450 downstream of the radius controller assembly 490 (in the direction of pipe unspooling). The purpose of the straightener assembly 510 is to impart a reverse bending force to the pipe sufficient to overcome the curvature set by the radius controller 490. For this purpose, three reaction points are required to be exerted on the pipe, the two end points acting on one direction and the intermediate point acting in the opposite direction, such that all 3 forces are substantially coaligned in the plane of pipe bending. A two-roll straightener can be used in which the radius controller is considered as one reaction point. Advantageously and for greater flexibility of operation, a "three-roll" straightener apparatus 510 is used; the straightener rolls may, in fact, comprise tracks of the type described for example in assignee's U.S. Pat. No. 3,680,342, the entire disclosure of which is incorporated here by reference.

Advantageously in the preferred embodiment designed for construction, the straightener assembly 510 comprises a first track assembly 512 a second track assembly 514 and a third track assembly 516. For convenience hereafter the straightener track assemblies 512, 514, 516 will be referred to generically as "straightener rolls", it being implicit therein that the track assemblies can be replaced by individual rollers, if desired.

The first straightener roll 512 is mounted to and between radius controller frame members 494 and is pivotably movable therewith as controlled by jacking assembly 498. Straightener roll 514 is mounted in a straightener frame assembly 518 carried by the level wind 450. Straightener roll 514 is located on the opposite side of the pipe passage from straightener roll 512 and is adjustable in a direction substantially perpendicular to the nominal longitudinal axis of pipe passing through the pipe conditioning apparatus 40. The third straightener roll 516 is also mounted in the straightener frame 518 on the same side of the pipe passage as the first straightener roll 512; straightener roll 516 is substantially fixed in position.

One of the features of the three roll straightener apparatus of this invention is that both of the first and second straightener rolls 512 and 514, respectively, are adjustable relative to each other and to the nominal pipe passage to thereby maintain the actual pipe path so close to the desired nominal as possible for varying pipe sizes and ramp angles.

The straightener assembly also incorporates the tensioner apparatus 520. Specifically, in the presently preferred embodiment, the tensioner may comprise a track or roll 522 mounted in the straightener frame 518 and adjustable in a direction substantially perpendicular to the nominal pipe path in a similar manner as straightener roll 514. Once such suitable tensioner mechanism is used on the aforementioned "Chickasaw" and is described in one or more of the above referenced Sugasti et al, Gibson, Mott et al and Key et al U.S. patents, the entire disclosures of which are incorporated here by reference.

3e. Additional Equipment

Additional pipe handling equipment, including a movable clamping assembly (not shown), a fixed clamping assembly 530 and a stern pipe guide assembly 540 are also located on the level winder assembly 450. This additional pipe handling equipment is not germane to the present invention and no further details thereof are described herein.

The pipe coming off the reel 210 should make sufficient contact with the radius controller 490 at a tangent thereto to bend the pipe sufficiently so that each wrap of pipe being unspooled will have the same amount of curvature as it enters the straightener.

One way which has been suggested to accomplish this uniformity would be to pass the pipe through a preferably vertically adjustable set of rollers 562 located on a tower 560 aft of the reel 210. The rollers 562 force each wrap of pipe to have a sufficiently large radius of curvature to be tangent to the radius controller 490 as the pipe is unspooled. Absent rollers 562 or some similar mechanism for imparting the desired bending moment to the pipe, each wrap of pipe unspooled would have a different set; that is, the inner wraps have a smaller radius of curvature than the outer wraps so that the curve on the free pipe between the reel and the pipe conditioning equipment would change as a function of the wrap being unspooled; this, in turn, would cause the pipe to contact the radius controller at a different location for each wrap, thereby altering the effect of the radius controller and its ability to impart a uniform radius of curvature to the pipe before it passes through the straightening assembly 510.

As an alternative to the tower shown, it is considered that a "free floating" roller assembly may be used. Such roller assembly would ride on the upper surface of the pipe and be tied to the deck of the ship by cable, thus, the pipe and cables together act as the roller support, with the pipe exerting an upward force and the cable a downward force on the rollers.

The roller assembly 562 whether tower-mounted or cable tethered, increases the ability of the reel to impart larger hold-back tensions on the pipe than would be possible without such roller assembly 562. This factor increases the capability of the ship of this invention to lay larger pipe in deeper water than might otherwise be the case.

4. Portable Reels

The reel ship of this invention is capable of carrying spooled pipe on "portable" reels, that is, reels which do not form part of the basic ship construction, but which are mounted on, e.g., skids, and may be offloaded at the shore base. This advantageous feature permits the shore base to prespool pipe on such portable reels and store the spooled reels in the yard while the reel ship is at sea. When the ship returns to port, any empty portable reels on board can be removed and the prespooled waiting reels be loaded on board, thereby reducing down time in port.

Advantageously, one or more such portable reels, generally capable of carrying up to 6" diameter pipe, may be mounted on the clear deck space forward of the main reel 210. This secondary pipe may be passed over the main reel to the pipe handling apparatus 40. The secondary pipe may bypass the straightener assembly 510 and be bundled with the main pipe upstream of the stern guide assembly 540 so that it enters the water at the same lay angle as the main pipe.

5. General characteristics

In a preferred embodiment of this invention, the reel 210 has a diameter of about 82 feet. Pipe capacity is about 2,000 tons. Capacities in terms of pipe size and length are shown below:

| Nominal Pipe Size (Inches) | Approximate Capacity (Feet) | (Miles) |
|---|---|---|
| 4 | 267,000 | 50.5 |
| 6 | 160,000 | 30.2 |
| 8 | 104,000 | 19.7 |
| 10 | 73,000 | 13.8 |
| 12 | 54,000 | 10.3 |
| 14 | 45,000 | 8.5 |
| 16 | 30,000 | 5.7 |

Capacities shown are for typical projects in medium to deep water. The vessel is also capable of carrying two portable reels with total capacity of 500 tons. The portable reels are positioned so their pipes may be payed out as a bundle with the primary pipe.

Other characteristics of the preferred embodiment of the reel ship of this invention are (approximately):

| | |
|---|---|
| Length overall | 405 feet |
| Beam | 70 feet |
| Depth | 28 feet, 6 inches |
| Draft, operating | 18 feet |

6. Applications

Below are discussed a number of uses for the reel ship in the offshore construction industry.

6a. Subsea Completions

Of the many potential uses employed by the reel ship, one of the most important applications is in subsea completions and subsea tie-ins. Major advantages include:

1. Pipe is welded and tested on shore before laying offshore. This is especially an advantage for through flow lines, which can be drifted before laying.
2. Speed of laying pipes offshore substantially reduces delays due to weather and minimizes interference with field operations.
3. Since the vessel can dynamically position itself next to platforms, wellheads, etc., the danger to underwater pipelines or other bottom equipment is minimized. The reel ship is also much faster in setting up, moving away from, and moving between locations.
4. Except on the largest of projects, one load of pipe is all that is required to complete pipelines to subsea wellheads.
5. The reel ship can lay bundled configurations made up of pipes or combinations of pipe and cable as desired.

6b. Bundled Pipelines

In the "stovepiping" method of laying pipeline offshore, a new section of pipe must be welded (added) every 40 or 80 feet. This method requires one "welding line" for one pipeline. If it is desired to lay pipe in bundles, then, in effect, a "welding line" must be set up for each pipe in the bundle. Since most standard pipelay barges are designed for just one pipeline, finding enough room for one or more additional pipe "welding lines" is difficult.

Furthermore, most pipeline vessels apply tension to the pipe with the use of a tensioner, specifically designed to handle one pipe, and not two or more.

These problems are overcome by the reel ship of this invention with the use of the main reel and one or more portable reels. A typical bundle, for example, could consist of an eight inch pipe coming off the main reel and four inch and two inch pipe coming off separate portable reels. It is also possible to have more than one pipe bundled toghther on a reel.

Pipes for different lay operations can be carried together on the reels. The experience of the assignee and/or its predecessors-in-interest in laying pipe by the reel method has shown that different size pipes can be spooled over other pipes without damage.

Because of the large spooling capacity of the reel ship of this invention on the main and portable reels, pipe can be carried on one trip for a number of separate lay operations, such as those required on a subsea completion project.

6c. Operation in Congested Areas

In an area which is congested with many platforms, pipelines, subsea completions, construction barges, supply boats, etc., the vessel which can operate without the use of a conventional anchoring system will have a great advantage.

One example of this application would be in a developed field which already has many operating pipelines.

If the need arose to bring an adjacent field's production into this facility by pipeline, it could be effectively accomplished with the dynamically positioned reel ship. With the pipe already loaded onto the reel, the ship would dynamically position itself next to the platform in the developed field, feed out the end of the pipe to the platform and lay away from the structure, thus requiring only a minimum time in the congested area.

Another application of the dynamic positioning capabilities of the reel ship would be pipeline tie-ins at platforms, subsea completions or manifold centers. Besides the reduced risk by not using anchors, the speed at which the ship can set up on location, move between locations, and move off location at the end of the job, will allow the maximum time to be devoted to completing the project during favorable weather periods.

6d. Laying Pipe in Shipping Lanes

Modern pipeline barges can lay more than two miles of pipe in a 24-hour period by the "stovepiping" method; present-day reel barges can lay the same amount of pipe in a fraction of that time. In each case, the barge anchor patterns in doing this may cover an area approximately three miles long and one mile wide. If this area is located in a major shipping lane, such as the English Channel, unnecessary delays to shipping could be expected.

In contrast, the reel ship could lay the two miles in a few hours, and, since no anchoring pattern is used, the vessel would occupy only a nominal width of the shipping lane during any particular period of time. The reel ship's unique pipelaying operation offers a means of reducing inconvenience to shipping when pipelines must be installed in areas with heavy commercial shipping traffic.

6e. Remote Locations—Worldwide Operations

Certain areas of the world, such as the Beaufort Sea, allow very little time each year for offshore construction. Similarly, land support bases and the logistics associated with the base operations, offer difficulty in supporting offshore operations.

The reel operation of the reel ship offers advantages, of which a few are listed below:

- The speed at which the reel ship can travel to such locations.
- The large pipe capacity the reel ship can carry in one trip.
- The speed in laying offshore.
- Minimum shore support if complete requirement of pipe can be carried in one load.

The reel ship will be able to mobilize from the Gulf of Mexico to offshore areas such as the North Sea, California, Brazil, and the Mediterranean in approximately 2½ weeks; the North Sea to the Mediterranean will take only one week.

Since the reel ship has a large carrying capacity for smaller pipes, it will be able to operate from a base, for example, in the North Sea, and mobilize to an area like the Mediterranean. This eliminates the need to set up bases in every area where pipe is laid.

In short, the reel ship is able to mobilize, complete the job, and demobilize in a short period of time.

7. Operating Example

The following example is presented to illustrate the basic reel method laying procedure.

A. Pipe size—10 inch nominal

B. Pipeline length—25 miles

The basic operation begins with coated pipe delivered to the spooling yard. The pipe is welded into approximately 1,700 foot lengths. All welds are X-rayed and coated before spooling onto the reel ship.

At the time the reel ship arrives, approximately 12.5 miles of pipe is ready for spooling. Thirty-nine 1,700 foot lengths of pipe are spooled aboard, stopping only to weld, X-ray and coat joints at the end of each new length.

The reel ship, now loaded with pipe and necessary anodes, mobilizes to location.

Once at location, the ship is dynamically positioned next to the frist platform and a cable tied to the platform is attached to the pipe.

The lay operation now commences.

Anodes are added at the sterm of the ship during laying. The ship is normally stopped for 3–5 minutes to add each anode as required.

At the end of the 12.5 mile bay, the pipe is secured in a clamp at the stern of the ship. An abandonment head is welded on and the pipe lowered to the seabed with a winch. The lowering/pick up cable is attached to a buoy.

The ship then returns to the yard to spool up the second load of pipe.

Upon returning to the laydown point, the pipe is picked up and again clamped. The new pipe is welded-on, the joint is X-rayed and coated, and the lay operation commences again. At the second platform the pipe is pulled in and secured at the platform. The pipeline is then tested and the reel ship is demobilized.

Additional features of the reel ship and its operation are described in a paper co-authored by Kenneth R. Friman, Stanley T. Uyeda and Herman Bidstrup, entitled "First Reel Pipelay Ship Under Construction—Applications Up to 16-inch Diameter Pipe 3000 Feet of Water" (OTC Paper No. 3069) to be presented at the Offshore Technology Conference in Houston, Texas, May 8–11, 1978 and contained in the proceedings thereof. Said Friman et al paper is incorporated herein in its entirety by reference thereto.

It will be seen from the foregoing description that the reel ship of this invention represents a new and different advance in the art of offshore reel type pipelaying techniques. In particular, the ship represents a new type of vessel construction which is advantageously suited for carrying large pipe spooling reels to conduct subsea pipelaying operations quickly and economically for a world market.

The invention may be embodied in other specific forms without departing from the spirit or essential characteristics thereof. The embodiment described above is therefore to be considered in all respects as illustrative and not restrictive, the scope of the invention being indicated by the hereafter appended claims rather than by the foregoing description, and all changes which come within the meaning and range of equivalency of the claims are therefore intended to be embraced therein.

What is claimed is:

1. A reel pipelaying ship having forward, midship and stern sections, comprising:
   port and starboard side outer longitudinally extending hull members;
   port and starboard side pairs of inner longitudinally extending bulkheads;
   a generally horizontal baseline at the ship's bottom;

a generally horizontal tank top spaced from and above the baseline;

a generally horizontal main deck spaced from and above the tank top;

a plurality of transverse bulkheads spaced fore and aft from each other, at least some of said transverse bulkheads extending substantially across the beam of the ship and others of said transverse bulkheads extending only partially across the beam of the ship, wherein said some and others of said bulkheads define at least in part a well adapted to receive a pipe-carrying reel;

port and starboard side upper and lower substantially horizontal midship structural members spaced one above the other and spaced from and above the main deck, said midship structural members extending longitudinally for at least a part of the length of the ship, wherein said midship structural members, in combination with portions of said outer hull members and said inner longitudinal bulkheads extending above the main deck level, comprise a pair of port and starboard side boxbeam reel support structures;

a pipe-carrying reel; and a pair of reel support bearing assemblies mounting said reel to said box-beam reel support structures such that the bearing assemblies rest on the upper end portions of a respective pair of said inner longitudinal bulkheads;

wherein said reel support structure distributes the load of said reel and bearings downwardly and longitudinally outwardly through said inner longitudinal bulkheads and transversely through said tank top and baseline.

2. A reel pipelaying ship, having forward, midship, and stern sections, and baseline, tank top, and main deck levels, comprising:

port and starboard side outer substantially longitudinal hull members and port and starboard side inner longitudinal bulkheads, each extending substantially the length of the ship, said hull members and bulkheads extending vertically at least between the baseline and main deck levels in the forward and stern sections and, in the midship section, substantially above the main deck level;

port and starboard side substantially horizontal transverse midship structural members extending between the top portions of the raised midship sections of said outer hull members and inner longitudinal bulkheads;

at least one port and starboard side intermediate substantially horizontal transverse member extending between said outer hull members and inner longitudinal bulkheads and vertically spaced between said tank top and midship structural members wherein the midship portions of said outer hull members and inner longitudinal bulkheads, transverse midship structural members, and the at least one intermediate transverse member together comprise a reel support structure; and bearing means for rotatably mounting a pipe-carrying reel to said reel support structure such that the load of the reel is distributed downwardly and outwardly, both longitudinally and transversely through the ship to maintain the stress on primary structural members of the ship within allowable stress limits for the materials used in the construction of said primary structural members.

3. A reel pipelaying ship having forward, midship, and stern sections, and baseline, tank top, and main deck levels, comprising:

a hull composed of a plurality of longitudinal port and starboard side primary sturcural members;

port and starboard side reel support structures, each having a substantially box-beam cross-section extending upwardly from said port and starboard side primary vessel structural members and above the main deck level of the ship in the midship section thereof to increase the section modulus of the ship in the midship section;

a pipe-carrying reel;

bearing means for mounting the reel for rotation about a substantially horizontal axis across the ship's beam; and bearing support means mounting the bearing means to the respective reel support structures and distributing the load of the reel downwardly and longitudinally outwardly through said reel support structures and primary ship structural members to maintain the stress on the ship's primary structural members within the maximum allowable stress limits for the materials used in the construction of the ship's primary structural members.

4. A reel pipelaying ship having forward, midship and stern sections, comprising:

port and star board side reel support structures, each having a substantially box-bean configuration and located at a substantially midship portion of the ship on and above the main deck level to a height sufficient to accommodate the largest permitted reel diameter, based on maximum pipe diameter and length to be carried by the ship;

a pipe-carrying reel rotatably mounted to said reel support structure about a substantially horizontal rotational axis extending transversely across said ship, said reel having a shaft, a pair of flanges spaced from each other and extending radially outward from the shaft, and a hub coaxial with the shaft and disposed between the flanges and containing at least one ballast compartment; and, means coupled to said reel for supplying ballast into said at least one ballast compartment in the hub and for venting the interior of the ballast compartment as ballast is supplied thereto.

5. A reel pipelaying ship according to claim 4, wherein:

the means for adding ballast into the reel hub is adapted to add ballast as pipe is being unspooled and while the reel ir rotating in sufficient amount to at least partially compensate for the weight of pipe being offloaded and to minimize the increase in GMT of the ship due to the offloading of the pipe.

6. The reel pipelaying ship according to claim 5, wherein ballast is added into the reel hub in sufficient amount to maintain the GMT of the ship within about 30° of its initial height between full reel and empty reel conditions.

7. A reel pipelaying ship according to claims 1, 2, 3 or 4, wherein the length of said reel support structure is at least 0.4L, where L is the length of the ship.

8. A reel pipelaying ship according to claim 1, 2 or 3 further comprising a skeg located on the underside of the stern section of the ship and so sized to contribute between about 1.4% and 2.1% of the ship's buoyancy at low draft and between about 1.0% and 1.5% of the ship's buoyancy at high draft.

9. The ship according to claim 30 and 31, wherein the propellers are spaced from the hull bottom such that a distance "a" between the hull bottom and the tip of the propeller blades is not less than 0.2D.

10. The ship according to claim 9, wherein the distance "a" is preferably between about 0.2D–0.4D.

11. The ship according to claim 10, wherein the distance "a" is about 0.21D.

12. The reel pipelaying ship according to claim 1, 2, 3, or 4, wherein the distance (in feet) from the center of gravity of the ship to its transverse metacenter (GMT) is no greater than about $0.00194B^2$, where B is the beam (in feet) of the ship.

13. The reel ship according to claim 12 wherein the GMT of the ship lies within the shaded portion of the graph shown in FIG. 17 of the drawing,
where GMT represents the vertical distance (in feet) from the center of gravity to the transverse metacenter of the vessel, and BEAM represents the beam or width of the vessel (in feet).

14. The reel pipelaying ship according to claim 13, wherein the GMT of the ship is maintained between about 3' and about 8' for all significant offshore operating conditions.

15. The reel ship according to claim 5, wherein the reel ballast means comprises:
fill and drain conduit means coupled to one axial end of said reel shaft through a swivel joint;
vent conduit means coupled to the other axial end of said reel shaft through a swivel joint;
first internal conduit means extending from the first swivel joint through said shaft and into the interior of said reel hub to provide a path for fluid ballast between the interior of the hub and ballast supply and drain means; and
second interior conduit means coupled to the second swivel joint and extending through the shaft into the interior of the reel hub to provide a path for air to be vented from the interior of the hub to the ambient atmosphere.

16. The reel ship according to claim 15, further comprising means for opening the vent conduit to the ambient atmosphere only during a minor part of one complete revolution of the reel.

17. The reel pipelaying ship according to claim 16, wherein said vent conduit openings comprises a cammed surface coupled for rotation with the reel shaft and switch means engageable with the cammed surface for controlling the operation of vent conduit valves and permitting the opening of said valves only at predetermined times.

18. The reel pipelaying ship according to claim 17, wherein said first and second interior means are disposed approximately 180° apart and wherein said switch means and cammed means permit opening of the vent conduit valves only when the second interior conduit is within about ±30° of its apex of rotation.

19. A reel pipelaying ship according to claim 1, 2, 3 or 4, further comprising:
pipe handling means located aft of the reel for conditioning pipe as it is unspooled from the reel and for guiding the conditioned pipe into the water during a pipelaying operation.

20. The reel pipelaying ship according to claim 5, wherein the distance (in feet) from the center of gravity of the ship to its transverse metacenter (GMT) is no greater than about $0.00194B^2$, where B is the beam (in feet) of the ship.

21. The reel ship according to claim 20 wherien the GMT of the ship lies within the shaded portion of the graph shown in FIG. 17 of the drawing,
where GMT represents the vertical distance (in feet) from the center of gravity to the transverse metacenter of the vessel, and BEAM represents the beam or width of the vessel (in feet).

22. The reel pipelaying ship according to claim 21, wherein the GMT of the ship is maintained between about 3' and about 8' for all significant offshore operating conditions.

23. A reel pipelaying ship according to claim 5, further comprising:
pipe handling means located aft of the reel for conditioning pipe as it is unspooled from the reel and for guiding the conditioned pipe into the water during a pipelaying operation.

24. A reel pipelaying ship according to claim 7, further comprising:
pipe handling means located aft of the reel for conditioning pipe as it is unspooled from the reel and for guiding the conditioned pipe into the water during a pipelaying operation.

25. A reel pipelaying ship according to claim 8, further comprising:
pipe handling means located aft of the reel for conditioning pipe as it is unspooled from the reel and for guiding the conditioned pipe into the water during a pipelaying operation.

26. A reel pipelaying ship according to claim 9, further comprising:
pipe handling means located aft of the reel for conditioning pipe as it is unspooled from the reel and for guiding the conditioned pipe into the water during a pipelaying operation.

27. A reel pipelaying ship according to claim 12, further comprising:
pipe handling means located aft of the reel for conditioning pipe as it is unspooled from the reel and for guiding the conditioned pipe into the water during a pipelaying operation.

28. A reel pipelaying ship according to claim 20, further comprising:
pipe handling means located aft of the reel for conditioning pipe as it is unspooled from the reel and for guiding the conditioned pipe into the water during a pipelaying operation.

29. A reel pipelaying ship according to claim 38 further comprising a skeg located on the underside of the stern section of the ship and so sized to contribute between about 1.4% and 2.1% of the ship's buoyancy at low draft and between about 1.0% and 1.5% of the ship's buoyancy at high draft.

30. A self-propelled reel pipelaying ship, having forward, midship, and stern sections, and baseline, tank top, and main deck levels, comprising:
port and starboard side outer substantially longitudinal hull members and port and starboard side inner longitudinal bulkheads, each extending substantially the length of the ship, said hull members and bulkheads extending vertically at least between the baseline and main deck levels in the forward and stern sections and, in the midship section, substantially above the main deck level;
port and starboard side substantially horizontal transverse midship structural members extending between the top portions of the raised midship sections of said outer hull members and inner longitudinal bulkheads;

at least one port and starboard side intermediate substantially horizontal transverse member extending between said outer hull members and inner longitudinal bulkheads and vertically spaced between said tank top and midship structural members wherein the midship portions of said outer hull members and inner longitudinal bulkheads, the transverse midship structural members, and the at least one intermediate transverse member together comprise a reel support structure;

bearing means for rotatably mounting a pipe-carrying reel to said reel support structure such that the load of the reel is distributed downwardly and outwardly, both longitudinally and transversely through the ship to maintain the stress on primary structural members of the ship within allowable stress limits for the materials used in the construction of said primary structural members; and drive propellers mounted to drive shafts extending through the hull bottom;

wherein the ratio of the diameter (d) of the propellers to the distance (H) from the mean water line of the ship to the center of the prop is in the range of from about 0.625:1 to 1.125:1 between high and low draft conditions, respectively.

31. A self-propelled reel pipelaying ship having forward, midship, and stern sections, and baseline, tank top, and main deck levels, comprising:

a hull composed of a plurality of longitudinal port and starboard side primary structural members;

port and starboard side reel support structures, each having a substantially box-beam cross-section extending upwardly from said port and starboard side primary vessel structural members and above the main deck level of the ship in the midship section thereof to increase the section modulus of the ship in the midship section;

a pipe-carrying reel;

bearing means for mounting the reel for rotation about a substantially horizontal axis across the ship's beam;

bearing support means mounting the bearing means to the respective reel support structures and distributing the load of the reel downwardly and longitudinally outwardly through said reel support structures and primary ship structural members to maintain the stress on the ship's primary structural members within the maximum allowable stress limits for the materials used in the construction of the ship's primary structural members; and drive propellers mounted to drive shafts extending through the hull bottom;

wherein the ratio of the diameter (D) of the propellers to the distance (H) from the mean water line of the ship to the center of the prop is in the range of from about 0.625:1 to 1.125:1 between high and low draft conditions, respectively.

32. A self-propelled reel pipelaying ship according to claim 30 or 31, further comprising a skeg located on the underside of the stern section of the ship and so sized to contribute between about 1.4% and 2.1% of the ship's buoyancy at low draft and between about 1.0% and 1.5% of the ship's buoyancy at high draft.

33. A self-propelled reel pipelaying ship according to claim 1, 3, 30 or 31, further comprising:

means for adding ballast into the reel hub as pipe is being unspooled and while the reel is rotating in sufficient amount to at least partially compensate for the weight of pipe being offloaded and to minimize the increase in GMT of the ship due to the offloading of the pipe.

34. The self-propelled reel pipelaying ship according to claim 33, wherein ballast is added into the reel hub in sufficient amount to maintain the GMT of the ship within about 30° of its initial height between full reel and empty reel conditions.

35. The self-propelled reel pipelaying ship according to claim 33, wherein the distance (in feet) from the center of gravity of the ship to its transverse metacenter (GMT) is not greater than about $0.00194B^2$, where B is the beam (in feet) of the ship.

36. The self-propelled reel ship according to claim 35, wherein the GMT of the ship lies within the shade portion of the graph shown in FIG. 17 of the drawing, wherein GMT represents the vertical distance (in feet) from the center of gravity to the transverse metacenter of the ship and BEAM represents the beam or width of the ship (in feet).

37. The reel pipelaying ship according to claim 36, wherein the GMT of the ship is maintained between about 3' and about 8' for all significant offshore operating conditions.

38. The reel ship according to claim 33, wherein the reel ballast means comprises;

fill and drain conduit means coupled to one axial end of said reel shaft through a swivel joint;

vent conduit means coupled to the other axial end of said reel shaft through a swivel joint;

first internal conduit means extending from the first swivel joint through said shaft and into the interior of said reel hub to provide a path for fluid ballast between the interior of the hub and ballast supply and drain means; and second interior conduit means coupled to the second swivel joint and extending through the shaft into the interior of the reel hub to provide a path for air to be vented from the interior of the hub to the ambient atmosphere.

39. The reel ship according to claim 38, further comprising means for opening the vent conduit to the ambient atmosphere only during a minor part of one complete revolution of the reel.

* * * * *

UNITED STATES PATENT AND TRADEMARK OFFICE
CERTIFICATE OF CORRECTION

PATENT NO. : 4,230,421
DATED : October 28, 1980
INVENTOR(S) : SPRINGETT ET AL

It is certified that error appears in the above—identified patent and that said Letters Patent is hereby corrected as shown below:

Column 5, line 31, after "figures" insert a --comma--.

Column 12, line 58, after "4:1", the "comma" should be a --semicolon--.

Column 14, line 24, "bearing" (second occurence) should be --bearings--.

Column 19, lines 37-38, "characteristics" should be --Characteristics--.

Column 21, line 68, "10 inch" should be --10-inch--.

Column 22, line 14, "frist" should be --first--.

Column 22, lines 42-43, subtitle --8. Summary-- is missing.

Column 23, line 22, "boxbeam" should be --box-beam--.

UNITED STATES PATENT AND TRADEMARK OFFICE
CERTIFICATE OF CORRECTION

PATENT NO. : 4,230,421
DATED : October 28, 1980
INVENTOR(S) : SPRINGETT ET AL

It is certified that error appears in the above—identified patent and that said Letters Patent is hereby corrected as shown below:

Column 24, line 51, "ir" should be --is--.

Column 24, line 5, "sturcural" should be --structural--

Column 24, line 60, "claims" should be --claim--.

Column 28, line 39, "semicolon" should be a --colon--.

Column 26, line 49, "claim 38" should be --claim 28--.

Signed and Sealed this

Fourth Day of January 1983

[SEAL]

Attest:

GERALD J. MOSSINGHOFF

Attesting Officer     Commissioner of Patents and Trademarks